(12) United States Patent　　　(10) Patent No.: US 12,416,962 B2
Tsien　　　(45) Date of Patent: Sep. 16, 2025

(54) MECHANISM FOR PERFORMING DISTRIBUTED POWER MANAGEMENT OF A MULTI-GPU SYSTEM BY POWERING DOWN LINKS BASED ON PREVIOUSLY DETECTED IDLE CONDITIONS

(71) Applicant: Advanced Micro Devices, Inc., Santa Clara, CA (US)

(72) Inventor: Benjamin Tsien, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 140 days.

(21) Appl. No.: 17/031,739

(22) Filed: Sep. 24, 2020

(65) Prior Publication Data

US 2022/0091657 A1　　Mar. 24, 2022

(51) Int. Cl.
*G06F 1/32*　　(2019.01)
*G06F 1/3228*　　(2019.01)
*G06F 9/48*　　(2006.01)

(52) U.S. Cl.
CPC .......... *G06F 1/3228* (2013.01); *G06F 9/4893* (2013.01)

(58) Field of Classification Search
None
See application file for complete search history.

(56) References Cited

U.S. PATENT DOCUMENTS

| | | | |
|---|---|---|---|
| 4,980,836 A | 12/1990 | Carter et al. | |
| 5,396,635 A | 3/1995 | Fung | |
| 5,617,572 A | 4/1997 | Pearce et al. | |
| 5,692,202 A | 11/1997 | Kardach et al. | |
| 6,334,167 B1 | 12/2001 | Gerchman et al. | |
| 6,657,534 B1 | 12/2003 | Beer | |
| 6,657,634 B1 | 12/2003 | Sinclair et al. | |
| 7,028,200 B2 | 4/2006 | Ma | |
| 7,085,941 B2 | 8/2006 | Li | |

(Continued)

OTHER PUBLICATIONS

Invitation to Pay Additional Fees, Communication Relating to the Results of the Partial International Search and Provisional Opinion Accompanying the Partial Search Result in International Application No. PCT/US2021/051814, mailed Dec. 21, 2021, 15 pages.

(Continued)

*Primary Examiner* — Danny Chan
(74) *Attorney, Agent, or Firm* — Kowert, Hood, Munyon, Rankin & Goetzel, P.C.; Rory D. Rankin

(57) ABSTRACT

Systems, apparatuses, and methods for efficient power management of a multi-node computing system are disclosed. A computing system includes multiple nodes that receive tasks to process. The nodes include a processor, local memory, a power controller, and multiple link interfaces for transferring messages with other nodes across links. Using a distributed approach for power management, negotiation for powering down components of the computing system occurs without performing a centralized system-wide power down. Each node is able to power down its links, its processor and other components regardless of whether other components of the computing system are still active or powered up. A link interface initiates power down of a link with delay or without delay based on a prediction of whether a link idle condition leads to the link interface remaining idle for at least a target idle threshold period of time.

17 Claims, 10 Drawing Sheets

(56) References Cited

U.S. PATENT DOCUMENTS

| | | |
|---|---|---|
| 7,394,288 B1 | 7/2008 | Agarwal |
| 7,428,644 B2 | 9/2008 | Jeddeloh et al. |
| 7,437,579 B2 | 10/2008 | Jeddeloh et al. |
| 7,496,777 B2 | 2/2009 | Kapil |
| 7,613,941 B2 | 11/2009 | Samson et al. |
| 7,743,267 B2 | 6/2010 | Snyder et al. |
| 7,800,621 B2 | 9/2010 | Fry |
| 7,802,060 B2 | 9/2010 | Hildebrand |
| 7,840,827 B2 | 11/2010 | Dahan et al. |
| 7,868,479 B2 | 1/2011 | Subramaniam |
| 7,873,850 B2 | 1/2011 | Cepulis et al. |
| 7,899,990 B2 | 3/2011 | Moll et al. |
| 8,181,046 B2 | 5/2012 | Marcu et al. |
| 8,402,232 B2 | 3/2013 | Avudaiyappan et al. |
| 8,438,416 B2 | 5/2013 | Kocev et al. |
| 8,656,198 B2 | 2/2014 | Branover et al. |
| 8,924,758 B2 | 12/2014 | Steinman et al. |
| 8,949,644 B2 | 2/2015 | Ma |
| 9,563,257 B2 | 2/2017 | Fang |
| 9,983,652 B2 | 5/2018 | Piga et al. |
| 10,671,148 B2 | 6/2020 | Tsien et al. |
| 2004/0015628 A1 | 1/2004 | Glasco et al. |
| 2005/0283523 A1* | 12/2005 | Almeida ............... G06F 9/4418 |
| | | 709/216 |
| 2006/0271649 A1 | 11/2006 | Tseng |
| 2008/0288798 A1 | 11/2008 | Cooper et al. |
| 2009/0235105 A1 | 9/2009 | Branover et al. |
| 2010/0077243 A1* | 3/2010 | Wang ................... G06F 1/3209 |
| | | 713/323 |
| 2010/0106876 A1 | 4/2010 | Nakahashi et al. |
| 2011/0083023 A1 | 4/2011 | Dickens |
| 2011/0153924 A1 | 6/2011 | Vash et al. |
| 2011/0264934 A1 | 10/2011 | Branover et al. |
| 2012/0254526 A1 | 10/2012 | Kalyanasundharam |
| 2013/0003559 A1* | 1/2013 | Matthews ........... H04L 43/0876 |
| | | 370/241 |
| 2013/0007483 A1* | 1/2013 | Diefenbaugh .......... G06F 1/325 |
| | | 713/320 |
| 2013/0007491 A1* | 1/2013 | Iyer ...................... G06F 1/3287 |
| | | 713/321 |
| 2013/0132755 A1* | 5/2013 | Cooper ................ G06F 1/3206 |
| | | 713/323 |
| 2013/0179621 A1 | 7/2013 | Smith |
| 2013/0311804 A1 | 11/2013 | Garg et al. |
| 2013/0332764 A1* | 12/2013 | Juang ................... H04L 49/109 |
| | | 713/320 |
| 2014/0095801 A1 | 4/2014 | Bodas et al. |
| 2014/0122833 A1 | 5/2014 | Davis |
| 2014/0281275 A1 | 9/2014 | Kruckemyer et al. |
| 2015/0373566 A1* | 12/2015 | Pius ...................... H04W 24/08 |
| | | 370/252 |
| 2016/0147285 A1 | 5/2016 | Alshinnawi et al. |
| 2016/0314024 A1 | 10/2016 | Chang et al. |
| 2017/0160781 A1 | 6/2017 | Piga et al. |
| 2017/0310492 A1* | 10/2017 | Wang ................... G06F 9/4401 |
| 2017/0353926 A1 | 12/2017 | Zhu |
| 2018/0004273 A1* | 1/2018 | Leucht-Roth ......... G06F 1/3209 |
| 2018/0081420 A1 | 3/2018 | Jones et al. |
| 2018/0157311 A1 | 6/2018 | Maisuria |
| 2018/0188797 A1* | 7/2018 | Wang ................... G06F 1/3275 |
| 2019/0196574 A1* | 6/2019 | Tsien ................... G06F 1/3296 |
| 2019/0204899 A1 | 7/2019 | Tsien et al. |
| 2019/0384733 A1* | 12/2019 | Jen ...................... G06F 1/3206 |
| 2019/0387074 A1* | 12/2019 | Seibert ................. G06F 1/1686 |

OTHER PUBLICATIONS

Li et al., "Compiler-Directed Proactive Power Management for Networks", CASES '05: Proceedings of the 2005 International Conference on Compilers, Architectures and Synthesis for Embedded Systems, Sep. 24, 2005, pp. 137-146.

International Search Report and Written Opinion in International Application No. PCT/US2018/051789, mailed Jan. 2, 2019, 14 pages. (5800-70901).

International Search Report and Written Opinion in International Application No. PCT/US2018/051916, mailed Jan. 31, 2019, 10 pages.

Yuan et al., "Buffering Approach for Energy Saving in Video Sensors", 2003 International Conference on Multimedia and Expo, Jul. 2003, 4 pages.

"Intel Power Management Technologies for Processor Graphics, Display, and Memory: White Paper for 2010-2011 Desktop and Notebook Platforms", Intel Corporation, Aug. 2010, 10 pages.

International Search Report and Written Opinion in International Application No. PCT/US2021/051814, mailed Apr. 4, 2022, 20 pages.

Office Action in Japan Patent Application No. 2023-518226, dated Jul. 8, 2025, 6 pages.

\* cited by examiner

MECHANISM FOR PERFORMING DISTRIBUTED POWER MANAGEMENT OF A MULTI-GPU SYSTEM BY POWERING DOWN LINKS BASED ON PREVIOUSLY DETECTED IDLE CONDITIONS

BACKGROUND

Description of the Related Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for desktop computers and servers utilizing high-performance microprocessors. These microprocessors include multiple processor cores, or cores, and multiple pipelines within a core.

A variety of computing devices, such as a variety of servers, utilize heterogeneous integration, which integrates multiple types of ICs for providing system functionality. The multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for system packaging to integrate the multiple types of ICs. In some computing devices, a system-on-a-chip (SOC) is used, whereas, in other computing devices, smaller and higher-yielding chips are packaged as large chips in multi-chip modules (MCMs).

Some computing devices include three-dimensional integrated circuits (3D ICs) that utilize die-stacking technology as well as silicon interposers, through silicon vias (TSVs) and other mechanisms to vertically stack and electrically connect two or more dies in a system-in-package (SiP). Regardless of the choice for system packaging, as the system scales to increase performance, the number of sockets increase, and powering down the computing system with the multiple sockets, each with a copy of the selected package, becomes more complicated.

In view of the above, efficient methods and systems for performing efficient power management for a multi-node computing system are desired.

BRIEF DESCRIPTION OF THE DRAWINGS

The advantages of the methods and mechanisms described herein may be better understood by referring to the following description in conjunction with the accompanying drawings, in which.

Figure 1:
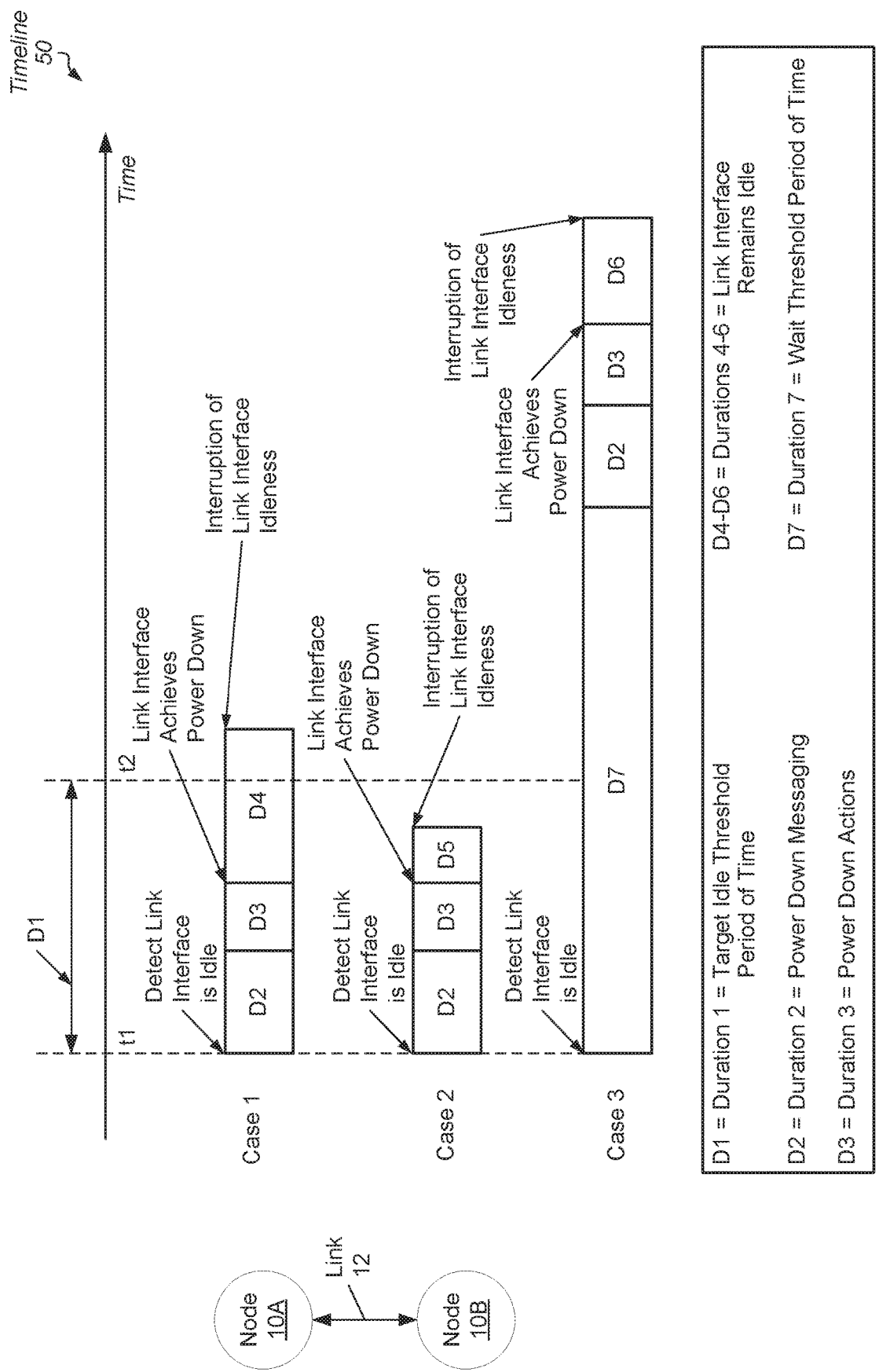
FIG. 1 is a block diagram of one embodiment of a timeline.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient power management for a multi-node computing system are disclosed. In various embodiments, a computing system includes a host processor that assigns tasks to nodes of a multi-node partition. The nodes include a processor and local memory. The processing node also includes at least a power controller, and multiple link interfaces for transferring messages with other nodes. As used herein, a processing node is also referred to as a node. In an embodiment, the host processor is a CPU and the node processors are GPUs. In some embodiments, the nodes are non-uniform memory access (NUMA) nodes utilizing GPUs to process tasks.

Using a distributed approach for power management, negotiation for powering down components of the computing system occurs without performing a system-wide power down of the computing system. Negotiation for power down occurs at the component level. Each node is able to power down its link interfaces and its processor while other components of the computing system are still active or powered up. Monitors monitoring data transfer on links between nodes determine when to initiate power down of a corresponding link. Intent to power down is communicated from the initiating node to the other node of the link. Once power down for the link is agreed upon between the two nodes, the link interfaces change the power management state of the link to a lower performance power management state. For example, the link is capable of powering down despite the processors of the two nodes remaining active.

The communication layer between the two nodes remains active during the power down of the link allowing operational state (e.g., active, idle) and/or power management state changes to be communicated. As used herein, a "power management state" is one of multiple "P-states" or one of multiple "C-states" supported by the nodes. Therefore, the power management state change is associated with a transition to one of the multiple C-states and P-states supported by the nodes. The power controllers of the nodes use P-states to update operational parameters of one or more of a processor and other components while the processor processes a workload. Examples of the operational parameters are an operational clock frequency and an operational power supply voltage. The power controller uses C-states to update operational parameters and/or power down components while the processor does not process a workload. When the processors of a node become idle and the power controller transitions the node to a particular C-state, the power controller of the node powers down one or more of the processor and other components. For example, the power controller of the node indicates the system memory implemented by DRAM enters a self-refresh mode. It is possible and contemplated that the power controller powers down other components of the node when the power management state of the node is one of the C-states.

Referring to FIG. 1, a generalized block diagram of one embodiment of a timeline 50 is shown. The timeline 50 illustrates durations of time beginning with a point in time t1 when a link interface of one of nodes 10A-10B detects the link 12 between nodes 10A-10B is idle. In various embodiments, the nodes 10A-10B include one or more processors, local memory, a power controller, and a link interface capable of communicating with the link 12 between the nodes 10A-10B. Link 12 transfers data between nodes 10A-10B. Although two nodes and a single link are shown in FIG. 1, another number of nodes and links used in a computing system are possible and contemplated. Although three cases indicated as cases 1-3 are shown in FIG. 1, any number of cases occur for link 12. For example, an interruption of link idleness for link 12 can occur at any point in time. The timeline 50 illustrates, in some cases, the negotiation between nodes 10A-10B to power down the link between them includes a combination of multiple durations of time such as durations "D2" to "D7."

In some cases, the link 12 remains idle for at least a first duration of time labeled as "D1," which is a target idle threshold period of time. In an embodiment, "D1" is a value stored in a programmable configuration register. The duration "D1" is a minimum idle residence of link 12 determined to provide sufficient power savings from powering down the link interfaces of nodes 10A-10B used to communicate on link 12. The top and bottom cases (case 1 and case 3) illustrate the target idle threshold period of time ("D1") elapses before an interruption of link idleness of link 12 occurs. In other cases, the link 12 does not remain idle for at least the target idle threshold period of time ("D1") before an interruption occurs. The middle case (case 2) illustrates this scenario. Examples of the interruption of link idleness as detected by the link interface of node 10A are messages arrive from a processor of node 10A for storage in the input queue of the link interface, messages directed toward tasks arrive from node 10B, and a message arrives from node 10B with an indication specifying a rejection of a previous power down request. Similarly, the link interface of node 10B is also capable of detecting these examples of interruptions.

As can be seen from FIG. 1, the nodes 10A-10B are capable of beginning negotiation to power down the link 12 prior to the target idle threshold period of time ("D1") elapses. The top and middle cases (case 1 and case 2) illustrate this scenario. Therefore, it is noted that detecting the target idle threshold period of time ("D1") elapses is not used to signal the start of negotiating the power down of a link between nodes 10A-10B. Although, the following discussion describes steps performed by circuitry of the link interface of node 10A, the circuitry of the link interface of node 10B is also capable of performing similar steps. In other words, each of the link interfaces of nodes 10A and 10B is capable of initiating power down of the link interfaces. The top case shown in FIG. 1 illustrates the link interface of node 10A detects an idle condition at the point in time t1 (or time t1). One example of an idle condition of the link interface is an input queue of the link interface storing messages and/or payload data to transfer to node 10B is empty. Additionally, the link interface of node 10A detects no data being received from node 10B. For the top case, at time t1, the link interface of node 10A begins negotiating with node 10B for power down. The negotiation uses two durations of time such as durations of time labeled "D2" and "D3."

Each of the durations of time "D2" and "D3" is a duration of time dependent on steps completing that are performed by hardware of the link interfaces of nodes 10A-10B. The second duration of time, which is labeled as "D2," includes mandatory power down messaging that occurs between nodes 10A-10B. Examples of the power down messages are a power down request, a power down response that accepts or rejects a received power down request, a withdrawal of a power down request, an indication of an operating state and/or a power management state of one or more processors of nodes 10A-10B, and so forth. It is possible that a single message includes two or more of the listed examples. For example, a power down response that accepts a power down request also includes an indication of one or more of an operating state and a power management state of one or more processors. Other combinations inserted into a single message are possible and contemplated. When the negotiation of the power down messaging results in progress toward powering down the link, the third duration of time, which is labeled as "D3," includes the power down actions. The power down actions include powering down one or more components of nodes 10A-10B including at least the link interfaces. The power down messaging results in progress toward powering down the link interfaces of nodes 10A-10B when it has been determined that the link interfaces are ready to power down.

It is noted that once the power down actions of the duration "D3" begin, these power down actions continue until completion without interruption and the link interfaces achieve being powered down. On the other hand, it is possible that the power down messaging that occurs during the duration "D2" does not result in progress toward powering down the link. For example, an interruption occurs that prevents the link interfaces from powering down. Although no case shown in FIG. 1 illustrates an interruption occurring during the duration "D2," such a case is possible and contemplated. In these cases, the link interface of node 10A did not remain idle for at least the target idle threshold period of time ("D1"). Similarly, even when the link interface of node 10A completes the steps of the power down messaging during the duration "D2" and the steps of the power down actions during the duration "D3," and the link interfaces of nodes 10A-10B are powered down, it is possible that an interruption occurs that prevents the link interfaces from remaining idle for at least the target idle threshold period of time ("D1"). The middle case shown in FIG. 1 illustrates this scenario.

The top case (case 1) shown in FIG. 1 illustrates the link interface of node 10A remains idle for at least the target idle threshold period of time ("D1"). For example, the duration of time labeled "D4" occurs after the durations "D2" and "D3," and the interruption occurs after the duration "D1" elapses at time t2. When such a case is common, it is beneficial to begin negotiating power down of the link interface of node 10A as soon as the idle condition is detected at time t1. However, the middle case (case 2) shown in FIG. 1 illustrates one example when the link interface of node 10A does not remain idle for at least the target idle threshold period of time ("D1"). For example, the duration of time labeled "D5" occurs after the durations "D2" and "D3," but an interruption occurs before the duration "D1" elapses at time t2. When such a case occurs often, it is beneficial to wait to begin negotiating power down of the link interface of node 10A when the idle condition is detected at time t1.

When the link interface of node 10A predicts the detection of an idle condition leads to the link interface remaining idle for at least the target idle threshold period of time ("D1"), then the link interface begins without delay negotiating power down of the link interface. For example, the link interface attempts to perform the steps shown in the top and middle cases (case 1 and case 2) illustrated in FIG. 1. However, when the link interface of node 10A predicts the detection of an idle condition does not lead to the link interface remaining idle for at least the target idle threshold period of time ("D1"), then the link interface delays negotiation of power down for the wait threshold period of time labeled "D7." For example, the link interface attempts to perform the steps shown in the bottom case (case 3) illustrated in FIG. 1. In various embodiments, the wait threshold period of time ("D7") is greater than the target idle threshold period of time ("D1"). In one example, the wait threshold period of time ("D7") is twice the target idle threshold period of time ("D1"). In other embodiments, the ratio of the wait threshold period of time ("D7") to the target idle threshold period of time ("D1") is any positive value greater than one, and the ratio is selected based on design requirements.

Figure 2:
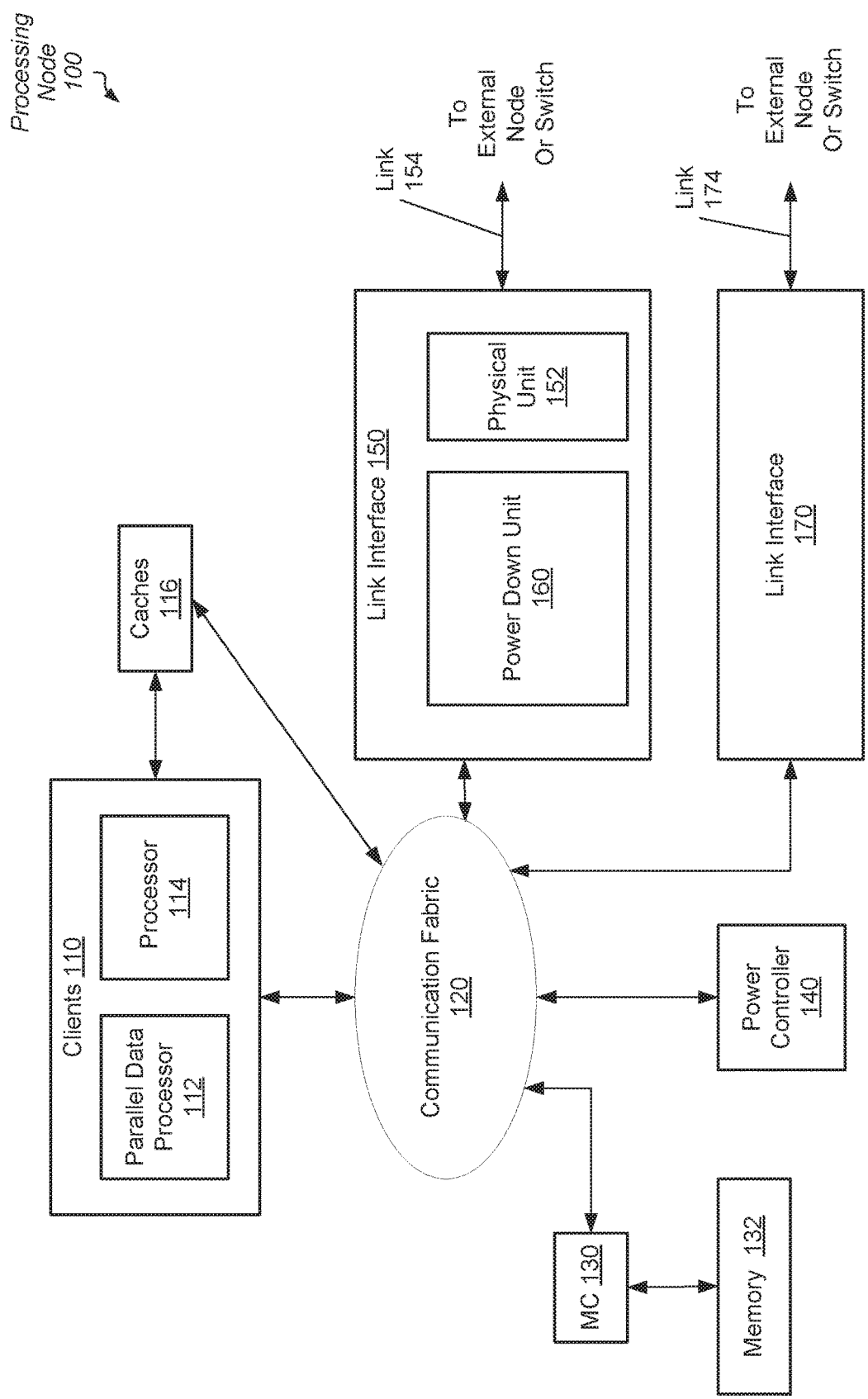
FIG. 2 is a block diagram of one embodiment of a processing node.

Referring to FIG. 2, a generalized block diagram of one embodiment of a processing node 100 is shown. As shown, processing node 100 includes communication fabric 120 between each of clients 110, one or more levels of caches 116, memory controller (MC) 130, power controller 140 and link interfaces 150 and 170. In some embodiments, the components of processing node 100 are individual dies on an integrated circuit (IC), such as a system-on-a-chip (SOC). In other embodiments, the components are individual dies in a system-in-package (SiP) or a multi-chip module (MCM).

Although clients 110 is shown to include two processors, in other embodiments, clients 110 includes another number of processors and processing engines. In the illustrated embodiment, clients 110 includes processor 112 and parallel data processor 114. In some designs, the clients 110 includes the processor 112, which is one or more of a central processing unit (CPU), a hub for communicating with a multimedia engine, and other types of computing resources with circuitry capable of processing instructions of software applications. In an embodiment, the parallel data processor 114 is one of a graphics processing unit (GPU), a digital signal processor (DSP), a field programmable gate array (FPGA), or other type of processor capable of simultaneously processing a same instruction on multiple data items.

The parallel data processor 114 has a high parallel data microarchitecture with a significant number of parallel execution lanes. The high parallel data microarchitecture provides high instruction throughput for a computational intensive task. In one embodiment, the microarchitecture uses a single-instruction-multiple-data (SIMD) pipeline for the parallel execution lanes. Compilers extract parallelized tasks from program code to execute in parallel on the system hardware. The parallelized tasks come from at least scientific, medical and business (finance) applications with some utilizing neural network training. The tasks include subroutines of instructions to execute. In various embodiments, the multiple execution lanes of the parallel data processor 114 simultaneously execute a wavefront, which includes multiple work-items. A work-item is a same instruction to execute with different data. A work-item is also referred to as a thread.

In some designs, the processing node 100 includes no general-purpose CPU, but receives assigned tasks from an external CPU. For example, one of the link interfaces 150 and 170 of the processing node 100 supports a communication protocol connection for transferring commands and data with the external CPU. Examples of the communication protocol are PCIe (Peripheral Component Interconnect Express), Infinity Fabric from Advanced Micro Devices, Inc., Infinity Architecture from Advanced Micro Devices, Inc., InfiniBand, RapidIO, HyperTransport, and so forth. Other examples of communication protocols are also possible and contemplated.

In various embodiments, communication fabric 120 transfers data, such as commands, messages, and payload data, back and forth between the clients 110, the caches 116, the link interfaces 150 and 170, and the memory 132 via the memory controller 130. Although two link interfaces 150 and 170 are shown, in other designs, another number of link interfaces are used. In some embodiments, communication fabric 120 includes at least queues for storing requests and responses, and selection logic implemented by hardware circuits capable of arbitrating between received requests before sending requests across an internal network. Communication fabric 120 also includes circuitry capable of building and decoding packets, and selecting routes for the packets.

In one embodiment, power controller 140 collects data from components of the processing node 100. In some embodiments, the collected data includes predetermined sampled signals. The switching of the sampled signals indicates an amount of switched capacitance. Examples of the selected signals to sample include clock gater enable signals, bus driver enable signals, mismatches in content-addressable memories (CAM), CAM word-line (WL) drivers, and so forth. In an embodiment, power controller 140 collects data to characterize power consumption in node 100 during given sample intervals.

In some embodiments, on-die current sensors and temperature sensors in processing node 100 also send information to power controller 140. Power controller 140 uses one or more of the sensor information, a count of issued instructions or issued threads, and a summation of weighted sampled signals to estimate power consumption for the processing node 100. Power controller 140 decreases (or increases) power consumption if node 100 is operating above (below) a threshold limit. In some embodiments, power controller 140 selects a respective power management state for each of the components in the processing node 100. Therefore, the power controller 140 and accompanying circuitry throughout the processing node 100 are capable of power gating components of node 100, or reducing a power management state of the components. The power controller 140 is also capable of sending control signals to components of node 100 to remove connection from a transitioning clock signal and a connection from a power supply reference. The power controller 140 is further capable of sending control signals to components of node 100 to reestablish connection to the transitioning clock signal and a connection to the power supply reference.

Although a single memory controller 130 is shown, in other embodiments, another number of memory controllers are used in processing node 100. In various embodiments, memory controller 130 receives memory requests from the clients 110 or cache controllers of the caches 116 via the communication fabric 120. The memory controller 130 schedules the memory requests using arbitration logic, and sends the scheduled memory requests to memory 132. In an embodiment, memory 132 is system memory for the processing node 100, and memory 132 is one of a variety of dynamic random access memory (DRAM) with a corresponding communication protocol supported by the memory controller 130. The communication protocol determines values used for information transfer, such as a number of data transfers per clock cycle, signal voltage levels, signal timings, signal and clock phases and clock frequencies. In some embodiments, the processing node 100 is also connected to main memory, which is a lower level than the system memory 132 in a hierarchical memory subsystem. Main memory is one of a variety of types of non-volatile, random access secondary storage of data. Examples of main memory are hard disk drives (HDDs) and solid-state disks (SSDs).

Memory controller 130 also receives responses from system memory 132 and main memory and sends the responses to a corresponding source of the request in the processing node 100. In order to complete the original memory request, a corresponding cache fill line with the requested block of data is conveyed from one of system memory 132 and main memory to a corresponding one or more of the caches 116 and an internal cache memory of the parallel data processor 112. In other words, the cache fill line is placed in one or more levels of caches. In some designs, the parallel data processor 112 includes a level one (L1) instruction cache and an L1 data cache. The caches 116 provides one or more of a level two (L2) cache and a level three (L3) cache used in the hierarchical cache memory subsystem. Other numbers of levels and other placement of the caches whether internal to the parallel data processor 112 or external placement are possible and contemplated.

In some embodiments, the address space of processing node 100 is divided among the parallel data processor 112, one or more other computing resources (not shown), one or more other external processing nodes connected to the processing node 100 via the interfaces 180, any external CPU, one or more other components such as input/output (I/O) peripheral devices (not shown) and other types of computing resources. Memory maps are maintained for determining which addresses are mapped to which component, and hence to which component a memory request for a particular address should be routed.

Besides supporting communication with an external CPU, link interfaces 150 and 170 also support communication between processing node 100 and other external processing nodes by transferring messages and data on links 154 and 174. As described earlier, in other designs, the processing node 100 uses another number of link interfaces other than the two link interfaces 150 and 170. Similarly, in other designs, the processing node 100 uses another number of links other than the two links 154 and 174. The physical unit 152 processes commands and data sent to and from link 154, and determines values used for information transfer, such as a number of data transfers per clock cycle, signal voltage levels, signal timings, signal and clock phases and clock frequencies. Similar to connections in the communication fabric 120, the links 154 and 174 can be used in point-to-point, packet-based, bus-based, including shared bus configurations, crossbar configurations, and hierarchical buses with bridges.

Although a single line is shown to represent link 154, the link 154 includes multiple lines, or physical wires or lanes, capable of transferring data as signals. Examples of these multiple lines are one or more clock lines, one or more control lines, one or more high-speed data lines, and one or more low-speed data lines. Circuitry in the physical unit 152 and an accompanying physical unit in an external link interface support data transmission rates on the one or more high-speed lines greater than data transmission rates of the one or more low-speed lines. The one or more high-speed data lines are referred to as the physical layer of link 154. The one or more control lines and the one or more low-speed lines are referred to as the communication layer of link 154. Link 174 has similar lines as link 154.

In various embodiments, link interfaces 150 and 170 use similar components such as power down unit 160 and physical unit 152 shown for link interface 150. A separate unit for interfacing with the communication fabric 120 is not shown for ease of illustration. In one embodiment, when link interface 150 is in a non-operational state, the physical unit 152 is incapable of transmitting signals, and correspondingly data, on the one or more high-speed clock lines and the one or more high-speed data lines of link 154. For example, the physical layer is "powered down." However, the physical unit 152 is capable of transmitting signals, and correspondingly data, on at least one low-speed clock line and the one or more low-speed data lines of link 154. In some designs, the physical unit 152 is also capable of transmitting signals on the one or more control lines of link 154. For example, the communication layer remains active, but consumes less power when operating than when the high-speed lines of link 154 are operating. The still-active communication layer allows the link interface 150 to transition the physical unit 152 to a higher power management state, or "power up" the powered down physical unit 152.

As used herein, "power down" refers to performing steps for a component such that the component consumes the least amount of power while the computing system still receives a power supply. In some designs, powering down includes selecting a lowest performance power management state, such as a lowest-performance P-state, for a corresponding component. In other designs, powering down a component includes selecting a C-state, which causes disabling of a clock signal to sequential elements and storage elements of the component and causes disabling connection to a power supply to multiple sub-components of the component. In yet other designs, putting the component in a sleep mode is equivalent to powering down the component. The hardware circuits of power down unit 160 determine when and the duration of a power down of the physical layer of link 154 and corresponding circuitry of link interface 150. As used herein, a component, such as a processor or a node, or a sub-component is referred to as "active" when the component performs work such as executing tasks. The component is referred to as "idle" when the component has no work to perform and remains inactive.

The power down unit 160 uses circuitry capable of monitoring data transferred on link 154, detecting an idle condition, and performing steps for powering down components of the physical unit 152 based on the detected idle condition. In various embodiments, the power down unit 160 powers down components of the physical unit 152 corresponding to high-speed data lines while one or more processing units of the clients 110 are active or idle. Based on the operational state of the physical unit 152, the power controller 140 is capable of powering down the node 100 while one or more external processing nodes are still active. A further description of these steps are provided in the following discussion.

Figure 3:
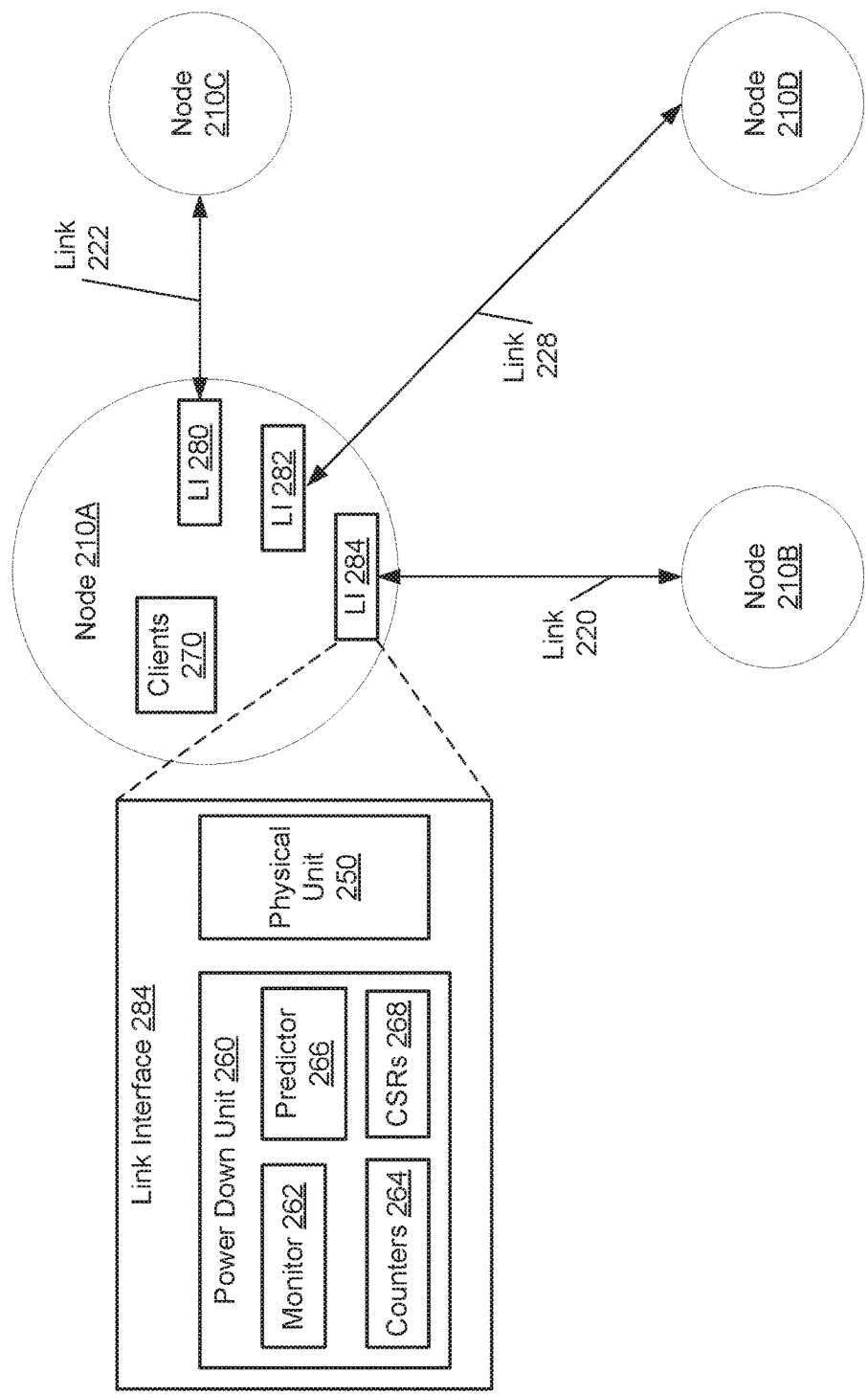
FIG. 3 is a block diagram of one embodiment of a multi-node computing system.

Referring to FIG. 3, a generalized block diagram of one embodiment of a multi-node computing system 200 is shown. In the illustrated embodiment, a portion of a partition is shown that includes processing nodes (or nodes) 210A-210D and at least links 220, 222 and 228. The links 220, 222 and 228 include multiple lines, or lanes, as described earlier for links 154 and 174 (of FIG. 1). In an embodiment, the partition 240 is a multi-chip module (MCM) placed in a socket of a multi-socket motherboard in a server. As used herein, a "partition" is also referred to as a "hive" when the computing system 200 utilizes the virtualization of hardware. In some designs, the nodes 210A-210D are non-uniform memory access (NUMA) nodes utilizing GPUs to process tasks.

One or more clients 270 of one or more nodes 210A-210D receive assigned tasks. In various embodiments, each of the processing nodes 210A-210D of the partition 240 has the functionality described earlier for processing node 100 (of FIG. 1). For example, clients 270 of node 210A are equivalent to clients 110 (of FIG. 1) and each of link interfaces 280, 282 and 284 is equivalent to link interfaces 150 and 170 (of FIG. 1). In an embodiment, the link interfaces for links 220, 222 and 228 support a same communication protocol such as the xGMI interconnect for GPU-to-GPU interconnections from Advanced Micro Devices, Inc. However, other types of communication protocols are possible and contemplated. The communication protocol determines values used for information transfer on links, such as a number of data transfers per clock cycle, signal voltage levels, signal timings, signal and clock phases and clock frequencies.

Link interface (LI) 280 is capable of transferring messages (commands) and payload data with node 210C on link 222, link interface 282 is capable of transferring messages and payload data with node 210D on link 228, and link interface 284 is capable of transferring messages and payload data with node 210B on link 220. In various designs, link interfaces 280 and 282 include similar components as shown for link interface 284 such as physical unit 250 and power down unit 260. A separate unit for interfacing with a communication fabric of node 210A is not shown for ease of illustration. In various embodiments, the physical unit 250 has the equivalent functionality of physical unit 152 (of FIG. 1). Similarly, the power down unit 160 (of FIG. 1) and the power down unit 260 have equivalent functionality with a further description of power down unit 260 provided in the following discussion.

Power down unit 260 includes a monitor 262, counters 264, predictor 266 and programmable configuration and status registers (CSRs) 268. In various embodiments, the components 262-268 are implemented with hardware circuits. In an embodiment, the functionality of a control unit is provided in monitor 262. In other embodiments, the functionality of a control unit is provided in a separate unit. In various embodiments, the messages sent across the links 220, 222 and 228 between nodes include an indication of an operating state of one or more nodes, a power down request, a power down response to a power down request, a withdrawal of a power down request, an interrupt, an indication of an operating state of one or more processors of the clients 270 such as an active state or an idle state, an indication of a power management state of one or more processors of the clients 270, and other information. It is noted that it is possible that a single message includes two or more of the listed examples. In one example, a single message sent between nodes includes both a power down response and an indication of an operating state of one or more processors of the clients 270. Other combinations of the listed examples combined in a single message are possible and contemplated. In an embodiment, one or more links of links 220, 222 and 228 are a point-to-point communication channel between two nodes. At the physical level, the links include one or more lanes.

Using a distributed approach for power management, negotiation for powering down components of the computing system 200 occurs prior to performing a system-wide power down of the computing system 200. Negotiation for power down occurs at the component level. Although, the following discussion describes steps performed by circuitry of link interface 284, the circuitry of link interfaces 280 and 282 are also capable of performing similar steps. Monitor 262 of link interface 284 of node 210A is able to detect an idle condition. In an embodiment, one example of an idle condition is an input queue storing messages and/or payload data to transfer from node 210A to 210B is empty, or otherwise, stores no messages or data to send to node 210B. The input queue is located in either one of the power down unit 260 and the physical unit 250. Further, link interface 284 does not detect data being received from node 210B.

When the monitor 262 detects an idle condition of link interface 284 and the predictor 266 provides a prediction that the detected idle condition leads to the link interface 284 remaining idle for at least a target idle threshold period of time, the power down unit 260 begins without delay negotiating power down of link interface 284. The counters 264 are also referred to as timers. One of the counters 264 measures a duration of time beginning at the detection of the idle condition, and circuitry of the power down unit 260 determines whether the measured duration reaches the target idle period of time before any interruption to powering down the link interface 284. The target idle period of time is equivalent to the duration "D1" in the timeline 50 (of FIG. 1). Based on the detected idle condition and the prediction from the predictor 266, the power down unit 260 sends a link power down request to node 210B on link 220 indicating a request to power down components of link interface 284 and components of the corresponding link interface on node 210B.

When the monitor 262 detects an idle condition and the predictor 266 provides a prediction that the detected idle condition does not lead to the link interface 284 remaining idle for at least a target idle threshold period of, the power down unit 260 delays negotiation of power down for a wait threshold period of time. The wait threshold period of time is equivalent to the duration "D7" in timeline 50 (of FIG. 1). The power down unit 260 inserts the wait threshold period of time into steps for powering down the link 220 by waiting the wait threshold period of time to elapse before sending a power down request to node 210B on link 220. One of the counters 264 measures a duration of time beginning at the detection of the idle condition and circuitry of the power down unit 260 determines when the measured duration reaches the wait threshold period of time if no interruption occurs beforehand. In various embodiments, each of the target idle period of time and the wait threshold period of time is stored in a programmable configuration register of CSRs 268. In various embodiments, the wait threshold period of time is greater than the target idle threshold period of time. For example, the ratio of the wait threshold period of time to the target idle threshold period of time is any positive value greater than one, and the ratio is selected based on design requirements.

When the monitor 262 detects the idle condition of link interface 284 and the power down unit 260 determines the target idle threshold period of time has elapsed with no data transfer on link 220, the predictor 266 updates a power down prediction value to indicate a higher confidence of a next detected idle condition of the link 220 leads to the link interface 284 remaining idle for at least the target idle threshold period of time. The power down prediction value is stored in a register of CSRs 268. In an embodiment, the power down unit 260 initializes the power down prediction value at zero, and increments the power down prediction value by one when the monitor 262 detects the idle condition of link interface 284 and the power down unit 260 later determines the link interface 284 remained idle for at least the target idle threshold period of time. However, when the monitor 262 detects the idle condition of link interface 284, but the power down unit 260 determines the link interface 284 did not remain idle for at least the target idle threshold period of time, the power down unit 260 decrements the power down prediction value by two. In an embodiment, the smallest value of the power down prediction value is zero.

The CSRs 268 store a success threshold. In an embodiment, the success threshold is four. After the power down unit 260 updates the power down prediction value, the predictor 266 compares the updated power down prediction value to the success threshold. It is noted that values other than the above values used in the example are possible and contemplated for the initial power down prediction value, the increment amount, the decrement amount, and the success threshold.

When the power down prediction value is equal to or greater than the success threshold, the predictor 266 provides a prediction that a current detected idle condition of the link interface 284 leads to the link interface 284 remaining idle for at least the target idle period of time. For example, a binary logic high value indicates a predicted "yes" for the current idle condition. In other designs, a binary logic low value indicates the predicted "yes." In contrast, when the power down prediction value is less than the success threshold, the predictor 266 provides a prediction that a current detected idle condition of the link interface 284 does not lead to the link interface 284 remaining idle for at least the target idle period of time. For example, a binary logic low value indicates a predicted "no" for the current idle condition. In other designs, a binary logic high value indicates the predicted "no."

It is also contemplated that one or more of the power down prediction value, the increment and decrement values of the power down prediction value, the wait threshold period of time 230, the target idle threshold period of time, and the success threshold is reset upon detection of particular conditions. Examples of these particular conditions are when a particular time period has elapsed, during detection of a new workload, and so forth. As described above, the power down unit 260 uses at least the power down prediction value, the increment and decrement values of the power down prediction value, the wait threshold period of time 230, the target idle threshold period of time, and the success threshold to determine when to send a power down request on link 220 to node 210B. The further steps of a powering down a link are provided in the following discussion.

Figure 4:
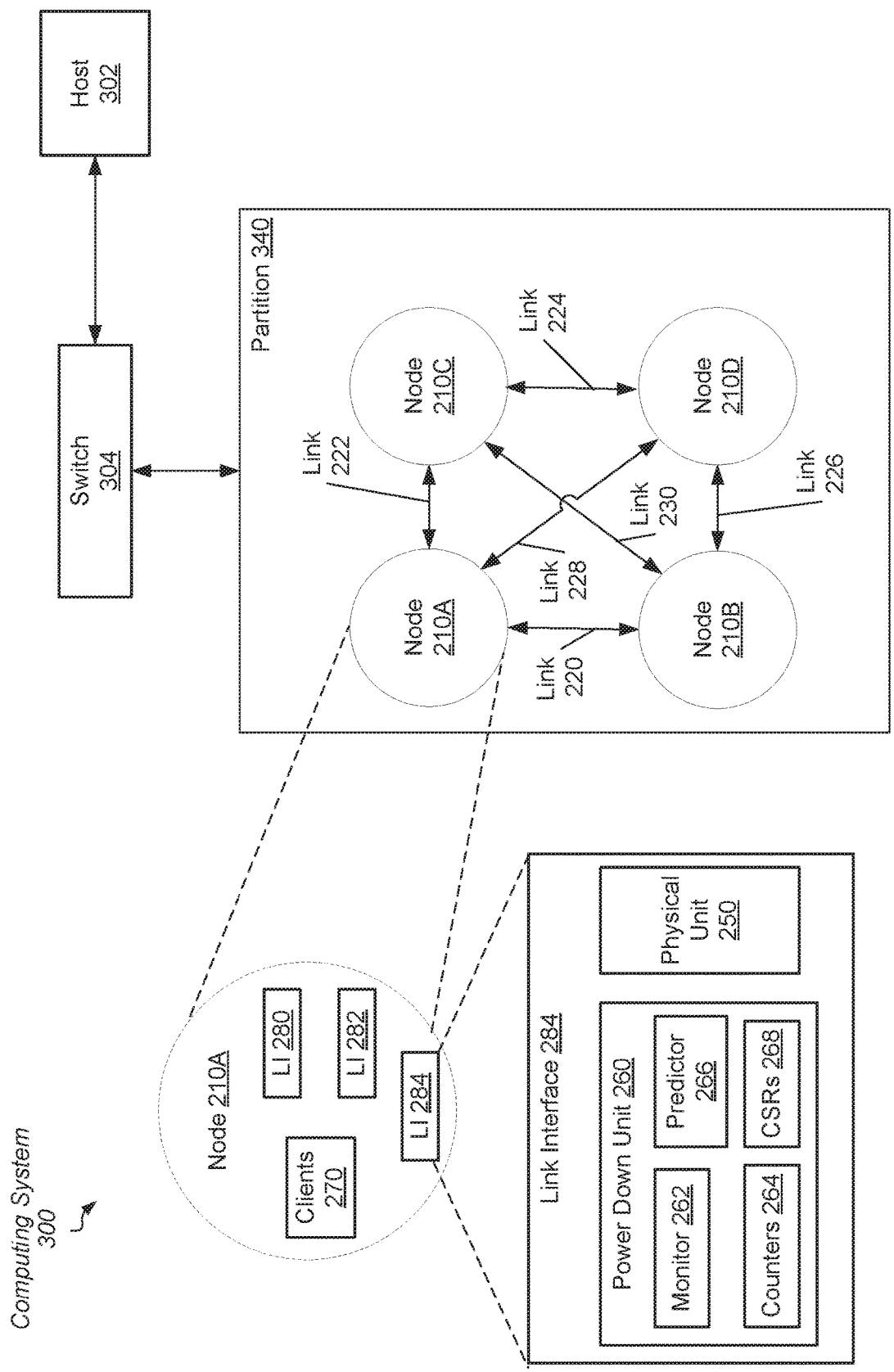
FIG. 4 is a block diagram of one embodiment of a multi-node computing system.

Turning now to FIG. 4, a generalized block diagram of one embodiment of a multi-node computing system 300 is shown. Circuitry described earlier are numbered identically. In the illustrated embodiment, a host processor 302 transfers commands, messages and payload data with a multi-node partition 340 via the switch 304. In other embodiments, the computing system 300 has no separate host processor 302, and relies on CPUs or other processors within the nodes 210A-210D to assign and transfer tasks to one another. In an embodiment, the partition 340 is a multi-chip module (MCM) placed in a socket of a multi-socket motherboard in a server. The partition 340 includes the processing nodes (or nodes) 210A-210D connected to one another via the links 220-230. The links 220-230 include multiple lines, or lanes, as described earlier for links 154 and 174 (of FIG. 1). As described earlier, in an embodiment, the link interfaces links 220-230 support a same communication protocol such as the xGMI interconnect for GPU-to-GPU interconnections from Advanced Micro Devices, Inc. However, other types of communication protocols are possible and contemplated.

A communication fabric, a memory interface, power controllers, interrupt controllers, and phased locked loops (PLLs) or other clock generating circuitry are not shown for ease of illustration. In some designs, the host processor 302 is a general-purpose central processing unit (CPU). The switch 304 supports a communication protocol such as PCIe (Peripheral Component Interconnect Express), Infinity Fabric from Advanced Micro Devices, Inc., and Infinity Architecture from Advanced Micro Devices, Inc. However, other types of communication protocols are possible and contemplated.

Although in the illustrated embodiment, the nodes 210A-210D are shown as fully connected, in other embodiments, one or more of the links 220-230 are not included in the partition 240. In some embodiments, computing system 200 includes other links between nodes 210A-210D in addition to links 220-230. In an embodiment, these other links are used for data transport to service requests, whereas links 220-230 are used for messaging such as messages for negotiating power down of components of the computing system 200. The host processor 302 assigns tasks, such as threads of a process, to the nodes 210A-210D. In one example, the host processor 302 divides the processing of 1,000 tasks of one or more software applications by assigning 250 tasks to each of the processing nodes 210A-210D. The host processor 302 assigns tasks 1-250 to node 210A, assigns tasks 251-500 to node 210B, assigns tasks 501-750 to node 210C, and assigns tasks 751-1,000 to node 210D. In addition, each of nodes 210A-210D is capable of sending direct memory access (DMA) requests in addition to other commands and tasks to another one of nodes 210A-210D. The one or more software applications are directed toward parallel data applications such as graphics rendering, neural network training, scientific computing, business applications, and medical applications and so on. To increase the performance of computing system 200 and assist the host processor 202, if used, in some designs, the computing system 300 uses virtualization software.

Virtualization software acts as an interface between a virtual machine (VM) operating system and the hardware of computing system 300. The virtualization software includes drivers, such as graphics drivers for graphics rendering applications, for the multiple virtual machines, which allows the multiple virtual machines to have simultaneous, direct access to a single physical GPU. Now, a single physical GPU is shared among multiple workloads and some of the work previously performed by the host processor 302 is now offloaded to the GPUs of the nodes 210A-210D. As used herein, a "hive" is also referred to as a "VM hive." A node of the nodes 210A-210D that is used for a current workload and receives assigned tasks from host processor 202 is considered to be a subscribed node. In contrast, a node of the nodes 210A-210D that is not used for a current workload and receives no assigned tasks from host processor 302 is considered to be an unsubscribed node. In various embodiments, link interfaces, such as link interface 284, of computing system 300 support a distributed approach for power management. Negotiation for power down in computing system 300 occurs at the component level using steps described earlier for computing system 200.

As described earlier, regarding the computing system 200 (of FIG. 2), the power down unit 260 of link interface 284 uses at least the power down prediction value, the increment and decrement values of the power down prediction value, the wait threshold period of time, the target idle threshold period of time, and the success threshold to determine when to send a power down request on link 220 to node 210B. As described earlier, other link interfaces of computing system 300, such as link interfaces 280 and 282 use components such as physical unit 250 and power down unit 260 of link interface 284. In one example, the link interface 280, which has similar components 250-268 as link interface 284, has qualified sending a request for a power down. The link interface 280 of node 210A sends the request to node 210C on link 222.

If the link interface 280 of node 210A receives a power down response from the link interface of node 210C that a power down request is granted, then the link interface 280 of node 210A and the corresponding link interface of node 210C proceed to perform the steps of powering down the link 222. This point in time is equivalent to the start of duration "D3" in timeline 50 (of FIG. 1). The power down actions are performed for link interfaces of link 222 regardless of whether processors or other clients in nodes 210A and 210C are still active. In an embodiment, the link interface 280 receives with the power down response an indication of an operational state of one or more clients of node 210C. Additionally, it is possible that the link interface 280 sent a power down request with an indication of an operational state of one or more clients 270. Further, it is contemplated that node 210A sends a notification to one or more of node 210B, node 210D and the host processor 302 that includes indications of the operational states and/or power management states of clients in node 210A and node 210C. Therefore, it is possible to power down link 222 while a processor of one or more of nodes 210A and 210C is active. As described earlier, the physical layer of link 222 is powered down while the communication layer of link 222 remains powered up. A similar distributed approach is supported by nodes 210A and 210B for link 220, by nodes 210C and 210D for link 224, by nodes 210B and 210D for link 226, and so forth.

In some designs, the power controller of node 210A monitors whether a threshold number of links of links 220, 222 and 228 of node 210A have been powered down. In one example, the threshold number of links is two and links 220 and 222 have been powered down. In this example, link 228 is still powered up for node 210A. When the threshold number of links have been powered down for node 210A, but not each link, and a processor of node 210A indicates that it has remaining tasks to execute, in an embodiment, the power controller of node 210A changes the power management state of the processor to a higher performance power management state. In some examples, a transition/change to a higher performance power management state is a transition from a first P-state to a higher performance second P-state. In other examples, a transition/change to a higher performance power management state is a transition from a C-state to a P-state. While the threshold number of links are not consuming power, the processor of node 210A is capable of executing tasks at a higher performance power management state.

When each of the links 220, 222 and 228 have been powered down for the node 210A, and the processor of the node 210A indicates that it is idle, in an embodiment, the power controller of node 210A powers down components of node 210A regardless of whether a processor in an external node is active. For example, the power controller of node 210A powers down node 210A regardless of whether the processors in nodes 210B, 210C and 210D are active or idle. The power controller of node 210A changes the power management state of the communication fabric of node 210A to a lower performance power management state. In some examples, a transition/change to a lower performance power management state is a transition from a first P-state to a lower performance second P-state. In other examples, a transition/change to a lower performance power management state is a transition from a P-state to a C-state. In some embodiments, a transition/change to a lower performance power management state indicates the system memory, such as memory implemented by DRAM, is able to enter a self-refresh mode. The power controllers for nodes 210B-210D operate in a similar manner as the power controller for node 210A. In some embodiments, node 210A sends a message on a communication layer to one or more of nodes 210B-210D and the host processor 302 that node 210A is going to power down.

Data transfer across the links 220-230 changes over time due to the types of workloads that the nodes 210A-210D execute. In one example, the nodes 210A-210D execute tasks that train a neural network. The training includes periodic transitions between a computation phase and a communication phase. During the computation phase, the processors of the nodes 210A-210D process tasks using data stored in the local system memory such as memory 132 (of FIG. 1). During the computation phase, the power controllers and link interfaces of nodes 210A-210D power down the unused links 220-230 on a distributed, individual basis. As described earlier, while at least a threshold number of links are powered down for a particular node of nodes 210A-210D, such as node 210A, the power controller of node 210A changes the power management state of one or more processors of node 210A to a higher performance power management state for executing the computation phase of the neural network workload. In some embodiments, node 210A also sends messages to one or more active nodes of nodes 210B-210D that include an indication of the new higher performance power management state and/or new operational state of the processors of node 210A. After the computation phase ends, the nodes 210A-210D have updated weight values to share. Utilizing the communication layer of links 220-230, the power controllers and the link interfaces of the nodes 210A-210D power up the links of links 220-230 that were powered down. When the links are powered up again, the nodes 210A-210D send the updated weight values to one another during the communication phase.

In some designs, the power controller of the host processor 302 monitors whether a threshold number of nodes 210A-210D have been powered down. In one example, the threshold number of links is two and nodes 210A and 210B have been powered down while nodes 210C and 210D remain powered up. Link 228 is still powered up for node 210A. When the threshold number of nodes have been powered down, but not each node, and the host processor 302 indicates that it has remaining tasks to execute, in an embodiment, the power controller of the host processor 302 changes the power management state of the host processor 202 to a higher performance power management state. Since the threshold number of nodes are not consuming power in computing system 300, the host processor 302 is capable of executing tasks at a higher performance power management state. When each of the nodes 210A-210D have been powered down, and the host processor 302 indicates that it is idle, in an embodiment, the power controller of the host processor 302 powers down the host processor 302 and its corresponding memory.

Figure 5:
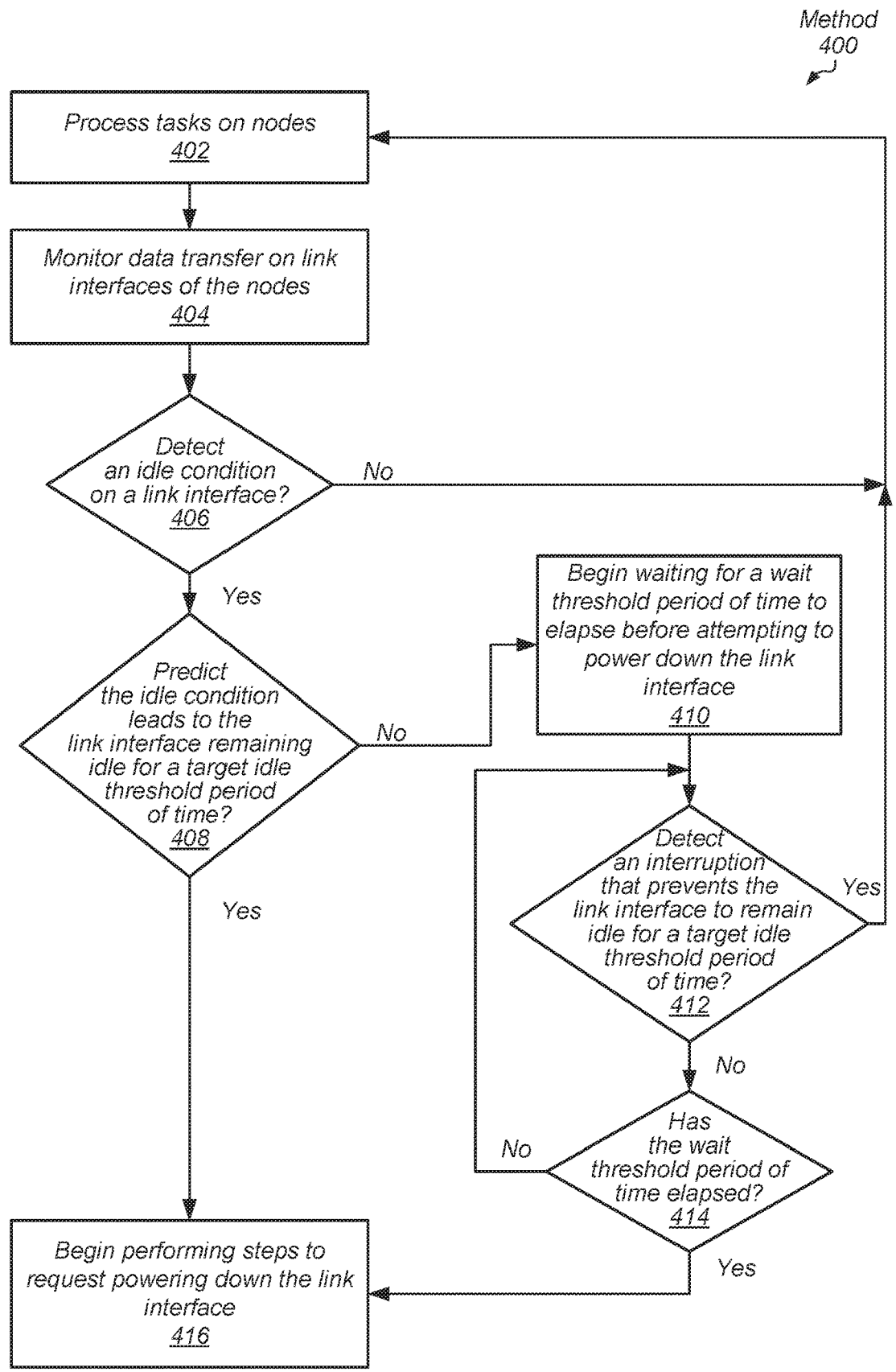
FIG. 5 is a flow diagram of one embodiment of a method for performing power management for a multi-node computing system.

Referring now to FIG. 5, one embodiment of a method 400 for performing power management for a multi-node computing system is shown. For purposes of discussion, the steps in this embodiment (as well as in FIGS. 6-8) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

Two or more nodes are placed in a partition of a computing system. The nodes include one or more processors, local memory, a power controller, and multiple link interfaces for transferring messages with other nodes across links. In an embodiment, a host processor assigns tasks to processors of the nodes. In various designs, the host processor is a general-purpose CPU. In other embodiments, applications are run on separate nodes, and a CPU in a node assigns tasks to a parallel data processor, such as a GPU, in the node. In addition, each of the nodes is capable of sending direct memory access (DMA) requests as well as other commands and tasks to another one of nodes. When a node is powered down, but the node is needed for the current workload, one or more of the host processor and another node, which is active, sends a power up request to the powered down node. In one example, the host processor sends an indication of a power up request that is transferred on a communication layer of a link of the powered down node. In another example, another active node sends a direct memory access (DMA) request to a memory of a processor, such as a GPU, of the powered down node. For some workloads, each node is active for the workload and receives assigned tasks from one or more of a host processor and another active node. For other workloads, one or more nodes are not used and receive no assigned tasks. These nodes and the corresponding links become idle and qualify to power down based on measured idle times. Regardless of the manner in which tasks are assigned to processors of the nodes, the steps for powering down links of unused nodes for the workload are similar to the steps to power down links of nodes used in the workload, but the links become idle during a computation phase or upon completion of tasks. These steps are further described below.

Processors of nodes that are assigned tasks process the tasks (block 402). In various designs, the nodes use graphics processing units (GPUs), and the nodes are non-uniform memory access (NUMA) nodes utilizing GPUs to process tasks. The link interfaces of the nodes use monitors to monitor data transfer on the link interfaces (block 404). One example of an idle condition of a link interface is an input queue of the link interface storing messages and/or payload data to transfer to another node is empty, or otherwise, the input queue stores no messages or data to send to another node. Additionally, the link interface detects no data being received from another node. If the circuitry of the link interfaces do not detect an idle condition ("no" branch of the conditional block 406), then control flow of method 400 returns to block 402 where the nodes process tasks.

If the circuitry of a link interface detects an idle condition ("yes" branch of the conditional block 406), but the circuitry of the link interface does not predict the idle condition leads to the link interface remaining idle for at least a target idle threshold period of time ("no" branch of the conditional block 408), then the link interface begins waiting for a wait threshold period of time to elapse before attempting to power down the link interface (block 410). In various embodiments, the wait threshold period of time is greater than the target idle threshold period of time. In various embodiments, the ratio of the wait threshold period of time to the target idle threshold period of time is any positive value greater than one, and the ratio is selected based on design requirements. The target threshold period of time and the wait threshold period of time are equivalent to the durations "D1" and "D7" in timeline 50 (of FIG. 1).

If the link interface has detected an interruption that prevents the link interface to remain idle for a target idle threshold period of time ("yes" branch of the conditional block 412), then control flow of method 400 returns to block 402 where processors of nodes process assigned tasks. Examples of these interruptions are messages arrive from a processor of the same node for storage in the input queue of the link interface, messages arrive from another node, and a message arrives with an indication specifying a rejection of a power down request. If the link interface has not detected an interruption that prevents the link interface to remain idle for a target idle threshold period of time ("no" branch of the conditional block 412), but the wait threshold period of time has not elapsed ("no" branch of the conditional block 414), then the link interface continues to wait and control flow of method 400 returns to conditional block 412. However, if the link interface has not detected an interruption that prevents the link interface to remain idle for a target idle threshold period of time ("no" branch of the conditional block 412), and the wait threshold period of time has elapsed ("yes" branch of the conditional block 414), then the link interface begins performing steps to request powering down the link interface without waiting for the wait threshold period of time to elapse (block 416). In various embodiments, the link interface begins performing steps to request powering down the link interface without waiting at all. Referring briefly to the timeline 50 (of FIG. 1), the link interface transitions from duration "D7" to the beginning of duration "D2" in case 3.

If the link interface detects an idle condition ("yes" branch of the conditional block 406), and the link interface predicts the idle condition leads to the link interface remaining idle for at least a target idle threshold period of time ("yes" branch of the conditional block 408), then the link interface begins performing steps to request powering down the link interface without waiting for further time to elapse (block 416). Referring briefly to the timeline 50 (of FIG. 1), the link interface begins the power down messaging at time t1 as shown for case 1 and case 2. In some embodiments, the steps performed during the power down messaging in duration "D2" include transmitting messages such as one or more of an indication of a power down request, an indication of a power down response (accept/grant, reject), an acknowledgment (accept/grant, reject) of a power down response, a withdrawal of a power down request, a message with an indication of an idle/active status of one or more of the clients of a node, and a message with an indication of an idle/active status of a corresponding link interface. During the transmission of these messages, when the link interface and the other corresponding link interface have determined that they are ready to power down, a message is sent that includes an indication of a start of a power down action. Referring briefly to the timeline 50 (of FIG. 1), this point it time is equivalent to the transition from duration "D2" to duration "D3." Whether or not the link interface remains idle for the target idle threshold period of time is used to update a predictor in the link interface as further described in the below discussion.

Figure 6:
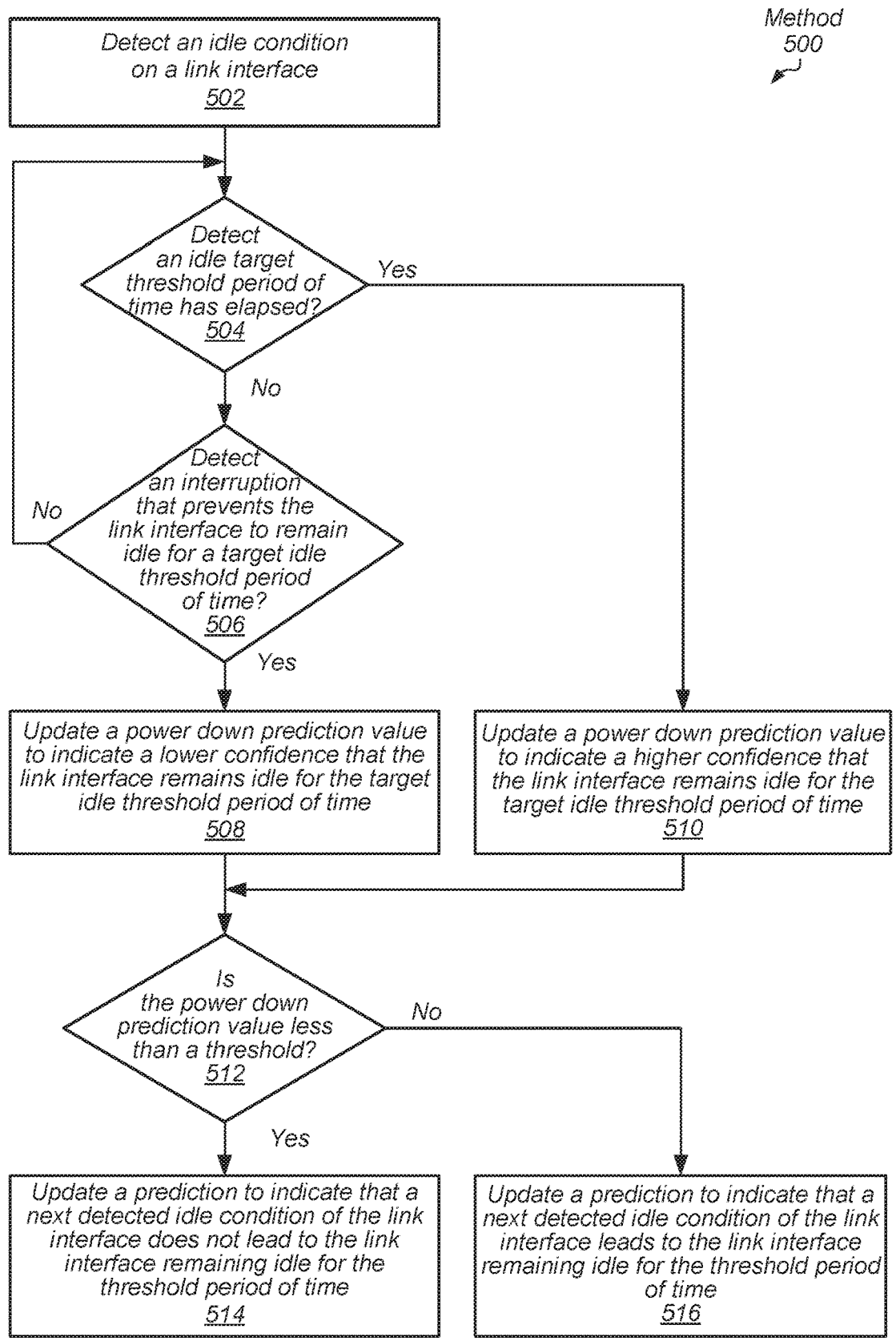
FIG. 6 is a flow diagram of another embodiment of a method for performing power management for a multi-node computing system.

Referring now to FIG. 6, one embodiment of a method 500 for performing power management for a multi-node computing system is shown. Two or more nodes are placed in a partition of a computing system, and tasks are assigned to the nodes. A link interface of a node detects an idle condition (block 502). If the link interface does not detect a target idle threshold period of time has elapsed ("no" branch of the conditional block 504), and the link interface has not detected an interruption that prevents the link interface to remain idle for a target idle threshold period of time ("no" branch of the conditional block 506), then the link interface continues to wait and control flow of method 500 returns to conditional block 504. The target idle threshold period of time is equivalent to the duration "D1" of timeline 50 (of FIG. 1).

If the link interface does not detect a target idle threshold period of time has elapsed ("no" branch of the conditional block 504), and the link interface detects an interruption that prevents the link interface to remain idle for the target idle threshold period of time ("yes" branch of the conditional block 506), then the link interface updates a power down prediction value to indicate a lower confidence that the link interface remains idle for the target idle threshold period of time (block 508). In one example, the particular link interface decrements a power down prediction value as described earlier during the description of the power down unit 260 (of FIG. 3). If the link interface detects a target idle threshold period of time has elapsed ("yes" branch of the conditional block 504), then the link interface updates a power down prediction value to indicate a higher confidence that the link interface remains idle for the target idle threshold period of time (block 510). In one example, the particular link interface increments the power down prediction value as described earlier during the description of the power down unit 260 (of FIG. 3).

The particular link interface compares the power down prediction value to a success threshold. If the power down prediction value is less than the success threshold ("yes" branch of the conditional block 512), then the particular link interface updates a prediction to indicate that a next detected idle condition of the link interface does not lead to the link interface remaining idle for the threshold period of time (block 514). Otherwise, if the power down prediction value is equal to or greater than the success threshold ("no" branch of the conditional block 512), then the particular link interface updates a prediction to indicate that a next detected idle condition of the link interface leads to the link interface remaining idle for the threshold period of time(block 516).

In various embodiments, parameters, such as the target idle threshold period of time, the wait threshold period of time, the amounts of the power down prediction value updates, and the success threshold, are determined during testing of the computing system while the computing system processes various workloads. In some embodiments, the link interfaces use the determined values of these parameters without further adjustment. In other embodiments, the link interfaces store, in circuitry, a mapping between an identifier that identifies a particular workload type and a set of values for the parameters. Therefore, the link interfaces are capable of dynamic adjustment of the parameters based on a current workload to process. When receiving assigned tasks, the nodes also receive an indication of the workload type, and the link interfaces of the nodes are capable of updating the above parameters used for distributed power management.

Figure 7:
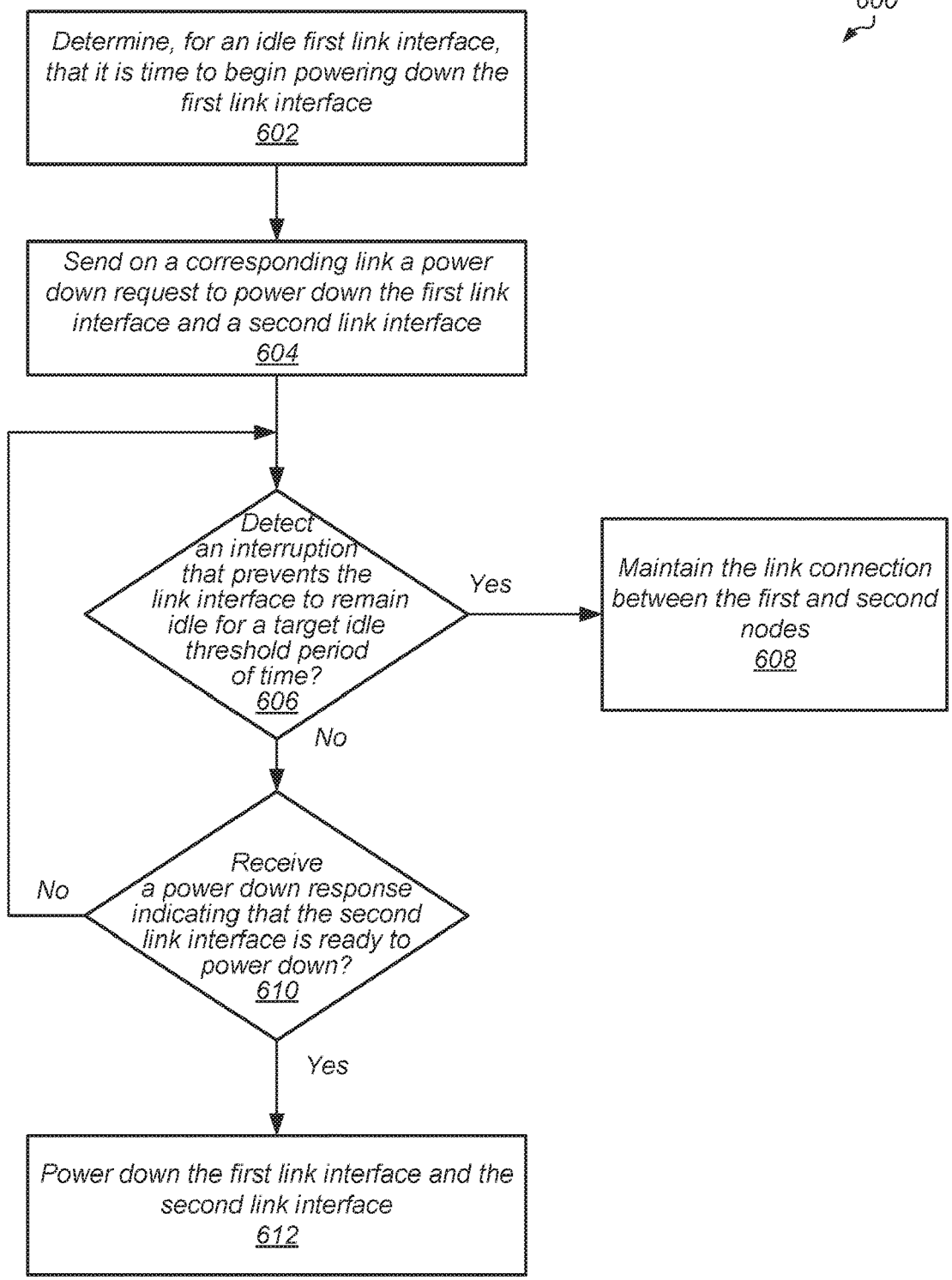
FIG. 7 is a flow diagram of another embodiment of a method for performing power management for a multi-node computing system.

Turning now to FIG. 7, one embodiment of a method 600 for performing power management for a multi-node computing system is shown. Two or more nodes are placed in a partition of a computing system, and tasks are assigned to the nodes. An idle first link interface of a first node determines that it is time to begin powering down (block 602). For example, circuitry of the first link interface has determined it has reached a state equivalent to block 416 of the earlier method 400 (of FIG. 5). For example, circuitry of the first link interface has both determined an idle condition has been detected and predicts the idle condition leads to the first link interface remaining idle for a target idle threshold period of time. The first link interface sends on a corresponding link a request to power down the first link interface of the first node and a second link interface of a second node on the other side of the link (block 604). The first link interface sends the power down request to the second link interface. This power down request is a message that is equivalent to a message used in the power down messaging of the duration "D2" of timeline 50 (of FIG. 1). Examples of the variety of types of power down messages used during the duration "D2" (duration of power down messaging) are provided in the earlier descriptions of the timeline 50 (of FIG. 1), the link interface 284 (of FIG. 2), and the method 400 (of FIG. 4) for performing power management for a multi-node computing system. By sending the power down request, the first link interface has begun the power down messaging that occurs during the duration "D2" of timeline 50. It is noted that although the description of method 600 has the first link interface initiating the power down messaging, it is possible and contemplated that the second link interface initiates power down messaging between the first link interface and the second link interface. In other words, similar to the link interfaces of nodes 10A-10B (of FIG. 1), each of the first link interface and the second link interface is capable of initiating power down of the link interfaces and performing the steps described for method 600.

If the first link interface detects an interruption that prevents the first link interface to remain idle for a target idle threshold period of time ("yes" branch of the conditional block 606), then the first link interface maintains the link connection between the first node and the second node (block 608). As described earlier, examples of these interruptions are messages arrive from a processor of the same node for storage in the input queue of the first link interface, messages arrive from another node, and a message arrives with an indication specifying a rejection of a power down request. In some embodiments, the first link interface also sends a message to the second link interface that indicates a withdrawal of the power down request.

If the first link interface does not detect an interruption that prevents the first link interface to remain idle for a target idle threshold period of time ("no" branch of the conditional block 606), but the first link interface has not received a power down response indicating that the second link interface is ready to power down ("no" branch of the conditional block 610), then control flow of method 600 returns to the conditional block 606 where the first link interface continues to wait for a response from the second link interface. While the first link interface waits, it monitors queues used to store messages to send across the link and queues used to store messages received from the link.

While the first link interface waits, the second link interface receives the power down request from the first link interface and determines whether it has an active operational state or an idle operational state. If the second link interface determines it is active, then the second link interface sends a message such as a power down response that rejects the power down request from the first link interface. In an embodiment, the message includes an indication of the active operational state of the second link interface. If the second link interface determines it is idle, then the second link interface sends a message, such as a power down response that accepts/grants the power down request from the first link interface. In an embodiment, the message includes an indication of the idle operational state of the second link interface. In some embodiments, after sending this type of message, the second link interface begins performing power down actions. In other embodiments, the second link interface waits for an acknowledgment from the first link interface indicating to continue to power down. This point in time is equivalent to the start of duration "D3" in timeline 50 (of FIG. 1).

If the first link interface does not detect an interruption that prevents the first link interface to remain idle for a target idle threshold period of time ("no" branch of the conditional block 606), and the first link interface has received a power down response indicating that the second link interface is ready to power down ("yes" branch of the conditional block 610), then the first link interface and the second link interface power down (block 612). This power down response is a message that is equivalent to a message used in the power down messaging of the duration "D2" of timeline 50 (of FIG. 1). Additionally, reaching block 612 of method 600 is equivalent to the transition from duration "D2" to duration "D3" in the timeline 50 (of FIG. 1) and one or more power down actions are initiated. As described earlier, powering down the first link interface includes one or more of disabling drivers, disabling one or more clock signals, disabling a power supply to one or more components of the first link interface, and transitioning one or more components to a sleep mode or a lowest performance power management state. In various embodiments, the first link interface powers down components corresponding to high-speed data lines of a physical layer while maintaining a current operational state for low-speed data lines of a communication layer.

When the second link interface sends a power down response to accepting/granting power down, the first link interface powers down regardless of whether the clients in the first node and the second node are active or idle. In an embodiment, the first link interface receives with the power down response from the second node an indication of an operational state of one or more clients of the second node. In one example, when at least one client of the second node is active, the indication in the power down response specifies an active status for the second node. In contrast, when each client of the second node is idle, the indication in the power down response specifies an idle status for the second node. Additionally, it is possible that the first link interface sent in the earlier power down request an indication of an operational state of one or more clients of the first node. In some designs, the indications are similar as the indications described for the power down response. Further, it is contemplated that one or more of the first node and the second node sends a notification (in a message) to one or more other nodes that includes indications of the operations states of the clients in one or more of the first node and the second node. These indications are used for determining whether to power down nodes as described in the following discussion.

Figure 8:
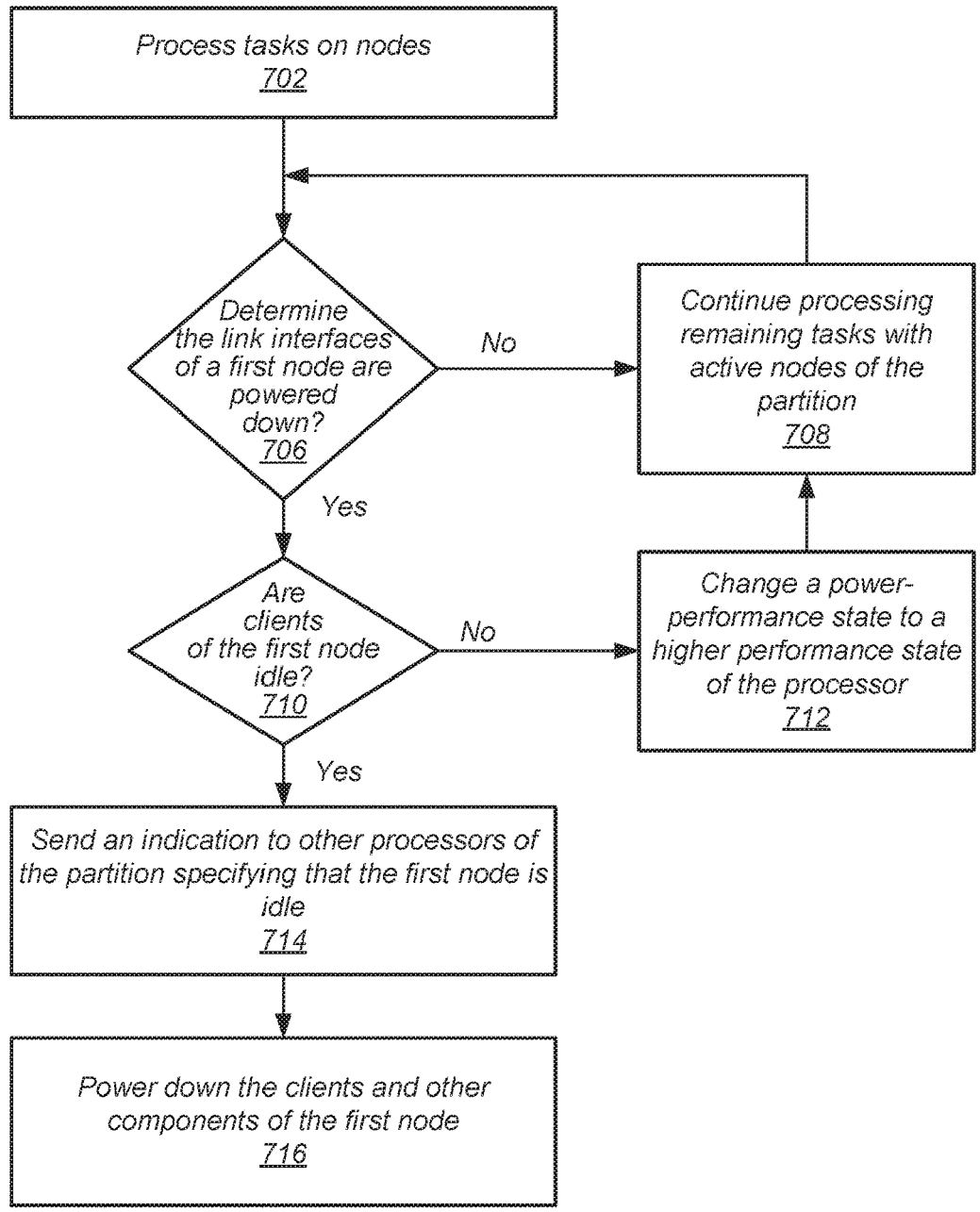
FIG. 8 is a flow diagram of another embodiment of a method for performing power management for a multi-node computing system.

Referring now to FIG. 8, one embodiment of a method 700 for performing power management for a multi-node computing system is shown. The processors of multiple nodes process assigned tasks (block 702). If a first node of the multiple nodes does not determine that the link interfaces of the first node are powered down ("no" branch of the conditional block 706), then the active nodes of the partition continue processing remaining tasks (block 708). Afterward, control flow of method 700 returns to conditional block 706. If the first node of the multiple nodes determines that the link interfaces of the first node are powered down ("yes" branch of the conditional block 706), but a processor of the first node is active ("no" branch of the conditional block 710), then a power controller of the first node changes a power management state of the processor to a higher performance power management state (block 712). Afterward, control flow of method 700 moves to block 708 where the active nodes of the partition continue processing remaining tasks. It is noted when a threshold number of links have been powered down for the node, but not each link, and a processor indicates that it has remaining tasks to execute, in an embodiment, the power controller of the first node changes the power management state of the processor to a higher performance power management state. Since the threshold number of links are not consuming power, the processor is capable of executing tasks at a higher performance power management state.

If the first node of the multiple nodes determines that the link interfaces of the first node are powered down ("yes" branch of the conditional block 706), and the clients of the first node are idle ("yes" branch of the conditional block 710), then the first node sends an indication to processors of one or more other nodes of the partition specifying that the first node is idle (block 714). In some embodiments, the first node sends the indication of a transition from an active status to an idle status of the clients of the first node on a communication layer, since the high-speed physical layer is powered down. The power controller of the first node powers down the clients and other components of the first node (block 716). For example, local memory is placed in a self-refresh mode, one or more clock signals are disabled for the processor of the first node, and one or more power supplies of the processor are gated. In some cases, the first node is the last remaining node to power down in the computing system that supports a distributed approach for power management. In other cases, the first node is not the last node remaining to power down in the computing system, but one or more other active nodes are aware the first node is powered down due to the indication sent in block 714. When the first node is needed once again to process tasks, the first node receives an indication specifying assigned tasks are ready, and the first node performs power up steps.

At such a point in time, the steps of block 702 are performed again with the first node being one of one or more active nodes processing tasks.

Figure 9:
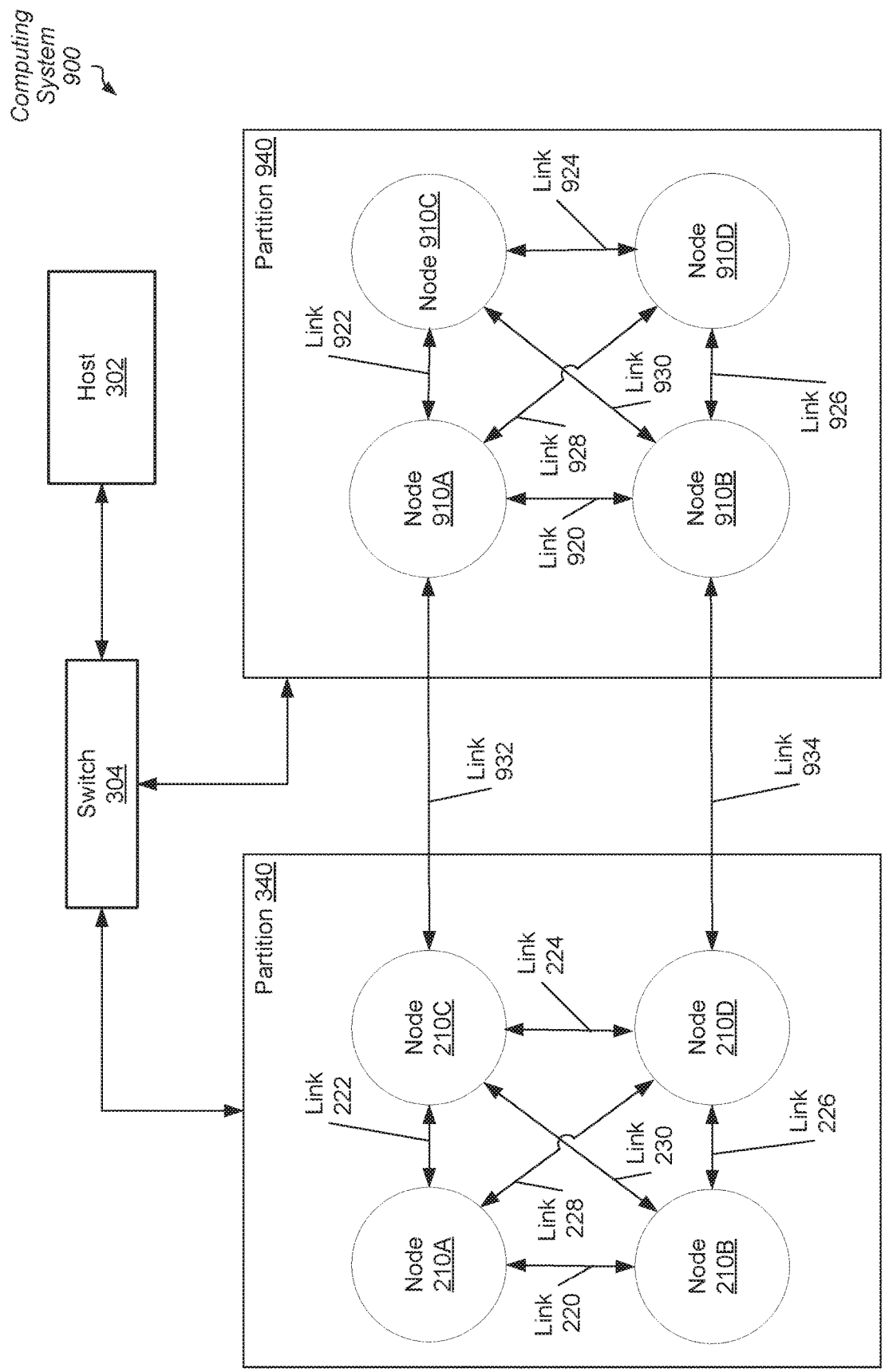
FIG. 9 is a block diagram of one embodiment of a multi-node computing system.

Turning now to FIG. 9, a generalized block diagram of one embodiment of a multi-node computing system 900 is shown. Circuitry previously described is numbered identically. In the illustrated embodiment, the host processor 302 transfers commands, messages and data with multi-node partition 340 and multi-node partition 940 via the switch 304. In some embodiments, each of the partitions 340 and 940 is a multi-chip module (MCM) placed in a socket of a multi-socket motherboard in a server. Although two partitions are shown, in other embodiments, the computing system 900 includes another number of partitions.

In various embodiments, each of the processing nodes 210A-210D of the partition 240 and each of the processing nodes 910A-910D of the partition 640 has the functionality described earlier for processing node 100 (of FIG. 2). In an embodiment, the links 920-930, 932 and 934 support a same communication protocol as supported by the links 220-230. In some designs, the nodes 210A-210D and the nodes 910A-910D are non-uniform memory access (NUMA) nodes utilizing GPUs to process tasks. In various embodiments, the computing system 900 uses a distributed approach for power management as described earlier for the computing systems 100-300 (of FIGS. 2-4). In several cases, one or more of the links 932 and 934 are powered down while one or more of the links and nodes of the partitions 340 and 940 remain powered up. In some cases, one of the partitions 340 and 940 is powered down while the other one of the partitions 340 and 940 remains powered up.

Figure 10:
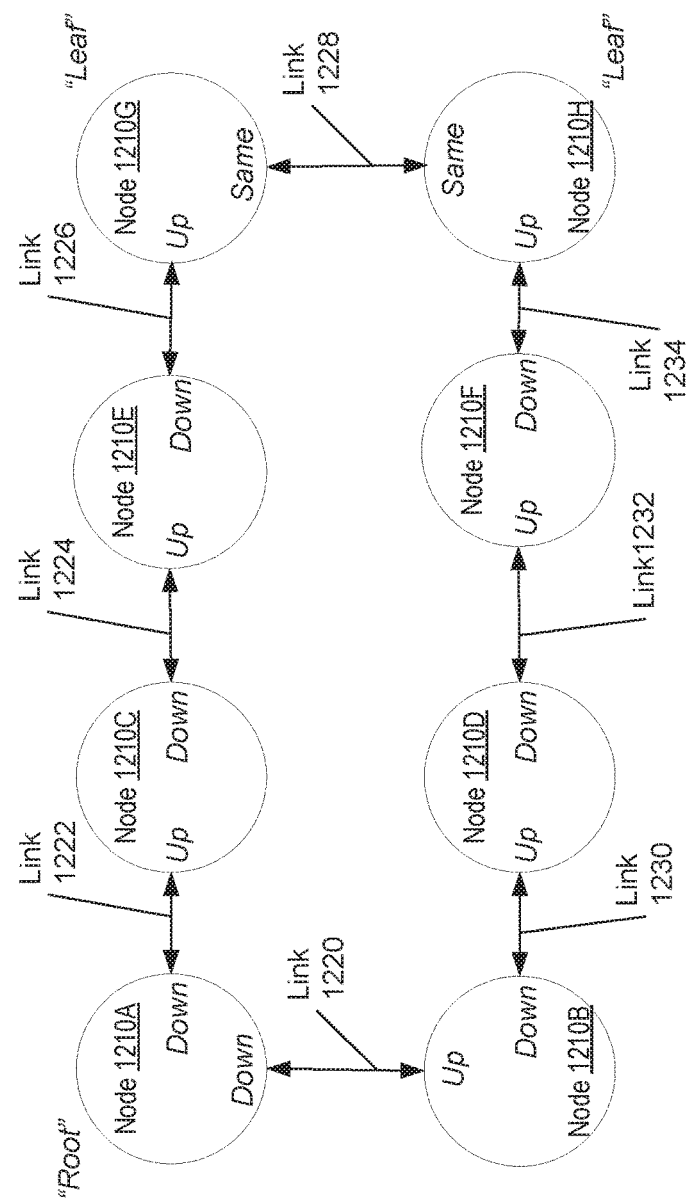
FIG. 10 is a block diagram of one embodiment of a multi-node computing system.

Referring to FIG. 10, a generalized block diagram of another embodiment of a multi-node computing system 1200 is shown. In various embodiments, each of the processing nodes (or nodes) 1210A-1210H has the functionality described earlier for processing node 100 (of FIG. 2), nodes 210A-210D (of FIGS. 3-4), and nodes 910A-910D (of FIG. 10). Additionally, each of links 1220-1234 has the equivalent functionality of links 220-230 (of FIG. 3) with accompanying link interfaces such as link interfaces 280-284 (of FIG. 3). In some embodiments, computing system 1200 includes other links between nodes 1210A-1210H in addition to links 1220-1234. These other links (not shown) are used for data communication, whereas links 1220-1234 are used for power management messaging. Therefore, in an embodiment, these other links are used for data transport to service requests, whereas, links 1220-1234 are used for messaging such as messages for negotiating centralized, system-wide power down, and distributed component-level power down.

In the illustrated embodiment, node 1210A is a root node (master node) of computing system 1200, whereas each of node 1210G and node 1210H are leaf nodes. Each of nodes 1210B-1210F are intermediate nodes between the root node 1210A and the leaf nodes 1210G-1210H. Thus, a ring data communication topology is used. In various embodiments, the computing system 900 uses a distributed approach for power management as described earlier for the computing systems 100-300 (of FIGS. 2-4).

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computing system comprising:
a first partition comprising:
a plurality of processing nodes, wherein each processing node comprises:
a memory; and
a plurality of clients, each comprising circuitry configured to:
execute tasks assigned to the processing node by a host processing node; and
send memory requests to the memory; and
a plurality of links between the plurality of processing nodes; and
wherein a first processing node of the plurality of processing nodes comprises circuitry configured to:
transfer data, via a first link interface of the first processing node, on a first link of the plurality of links between the first processing node and a second processing node of the plurality of processing nodes, wherein the data comprises at least tasks assigned by the second processing node for execution by the plurality of clients of the first processing node that cause the first processing node to be in an active operational state; and
initiate power down of the first link interface, in response to:
an idle condition of the first link interface; and
a prediction, based on one or more previously detected idle conditions, that the first link interface will remain idle for at least a target idle threshold period of time; and
wherein in response to each link interface of the first processing node being powered down and at least one processor of the first processing node being active, the circuitry of the first processing node is further configured to change a power management state of the at least one processor to a higher performance power management state.

2. The computing system as recited in claim 1, wherein the circuitry of the first processing node is further configured to initiate power down of the first link interface after a wait threshold period of time greater than the target idle threshold period of time, in response to:
the idle condition of the first link interface after the wait threshold period of time; and
a prediction before the target idle threshold period of time, based on the one or more previously detected idle conditions, that the first link interface will become active prior to the target idle threshold period of time.

3. The computing system as recited in claim 1, wherein the circuitry of the first processing node is further configured to:

update a power down prediction value to indicate a higher confidence that the first link interface will remain idle for at least the target idle threshold period of time, in response to:
no interruption has occurred prior to the target idle threshold period of time elapsing that prevents the first link interface from remaining idle for the target idle threshold period.

4. The computing system as recited in claim 1, wherein the circuitry of the first processing node is further configured to:
update a power down prediction value to indicate a lower confidence that the first link interface will remain idle for at least the target idle threshold period of time, in response to:
an interruption has occurred prior to the target idle threshold period of time elapsing that prevents the first link interface from remaining idle for the target idle threshold period.

5. The computing system as recited in claim 1, wherein the first link interface comprises circuitry configured to:
update a prediction to indicate that a next detected idle condition of the first link interface will not lead to the first link interface remaining idle for the target idle threshold period of time, in response to determining a power down prediction value is less than a threshold.

6. The computing system as recited in claim 1, wherein the first link interface comprises circuitry configured to:
update a prediction to indicate that a next detected idle condition of the first link interface will lead to the first link interface remaining idle for the target idle threshold period of time, in response to determining a power down prediction value is greater than or equal to a threshold.

7. The computing system as recited in claim 1, wherein:
the computing system further comprises a second partition; and
the first partition further comprises circuitry configured to power down remaining components of the first partition while the second partition has one or more active processing nodes, in response to determining each processing node of the first partition is powered down.

8. A method, comprising:
processing, by a first partition, a plurality of tasks, wherein the first partition comprises:
a plurality of processing nodes configured to process tasks, wherein each processing node comprises:
a memory; and
a plurality of clients, each comprising circuitry configured to execute program instructions of tasks assigned to the processing node by a host processing node that includes sending memory requests to the memory; and
a plurality of links between the plurality of processing nodes; and
transferring data, via a first link interface of a first processing node, on a first link of the plurality of links between the first processing node and a second processing node, wherein the data comprises at least tasks assigned by the second processing node for execution by the plurality of clients of the first processing node that cause the first processing node to be in an active operational state; and
initiating power down of the first link interface, in response to:
an idle condition of the first link interface; and
a prediction, based on one or more previously detected idle conditions, that the idle condition leads to the first link interface will remain idle for at least a target idle threshold period of time; and
wherein in response to each link interface of the first processing node being powered down and at least one processor of the first processing node being active, the method comprises changing, by circuitry of the first processing node, a power management state of the at least one processor to a higher performance power management state.

9. The method as recited in claim 8, further comprising initiating power down of the first link interface, by the circuitry of the first processing node, after a wait threshold period of time greater than the target idle threshold period of time, in response to:
the idle condition of the first link interface after the wait threshold period of time; and
a prediction before the target idle threshold period of time, based on the one or more previously detected idle conditions, that first link interface will become active prior to the target idle threshold period of time.

10. The method as recited in claim 8, further comprising:
updating, by the circuitry of the first processing node, a power down prediction value to indicate a higher confidence that the first link interface will remain idle for at least the target idle threshold period of time, in response to:
no interruption has occurred prior to the target idle threshold period of time elapsing that prevents the first link interface from remaining idle for the target idle threshold period.

11. The method as recited in claim 8, further comprising:
updating, by the circuitry of the first processing node, a power down prediction value to indicate a lower confidence that the first link interface remaining idle for at least the target idle threshold period of time, in response to determining:
an interruption has occurred prior to the target idle threshold period of time elapsing that prevents the first link interface from remaining idle for the target idle threshold period.

12. The method as recited in claim 8, further comprising:
updating, by the circuitry of the first processing node, a prediction to indicate that a next detected idle condition of the first link interface will not lead to the first link interface remaining idle for the target idle threshold period of time, in response to determining a power down prediction value is less than a threshold.

13. The method as recited in claim 8, further comprising:
updating, by the circuitry of the first processing node, a prediction to indicate that a next detected idle condition of the first link interface will lead to the first link interface remaining idle for the target idle threshold period of time, in response to determining a power down prediction value is greater than or equal to a threshold.

14. An apparatus comprising:
a physical unit comprising circuitry configured to manage transfer of data on a link between a first processing node and a second processing node of a plurality of processing nodes, wherein the data comprises at least tasks assigned by the second processing node for execution by a plurality of clients of the first processing node that cause the first processing node to be in an active operational state, wherein each processing node comprises:

a memory; and a plurality of clients, each comprising circuitry configured to execute program instructions of tasks assigned to the processing node by a host processing node that includes sending memory requests to the memory; and a power down unit; and wherein the power down unit comprises circuitry configured to initiate power down of the apparatus, based at least in part on:

an idle condition of the apparatus; and a prediction, based on one or more previously detected idle conditions, that the apparatus will remain idle for at least a target idle threshold period of time; and wherein in response to each link interface of the first processing node being powered down and at least one processor of the first processing node being active, the circuitry of the first processing node is configured to change a power management state of the at least one processor to a higher performance power management state.

15. The apparatus as recited in claim 14, wherein the circuitry of the power down unit is further configured to initiate power down of the apparatus after a wait threshold period of time greater than the target idle threshold period of time, in response to:

the idle condition of the apparatus after the wait threshold period of time; and a prediction before the target idle threshold period of time, based on the one or more previously detected idle conditions, that the apparatus will become active prior to the target idle threshold period of time.

16. The apparatus as recited in claim 14, wherein the circuitry of the power down unit is further configured to:

update a power down prediction value to indicate a higher confidence that the apparatus will remain idle for at least the target idle threshold period of time, in response to:

no interruption has occurred prior to the target idle threshold period of time elapsing that prevents the apparatus from remaining idle for the target idle threshold period.

17. The apparatus as recited in claim 14 wherein the circuitry of the power down unit is further configured to:

update a prediction to indicate that a next detected idle condition of the apparatus will not lead to the apparatus remaining idle for the target idle threshold period of time, in response to determining a power down prediction value is less than a threshold.

\* \* \* \* \*